US012727543B2

(12) United States Patent
Manzella et al.

(10) Patent No.: US 12,727,543 B2
(45) Date of Patent: Sep. 8, 2026

(54) DELEAFING APPARATUS AND METHOD

(71) Applicant: Platform Robotics, Inc., Birmingham, MI (US)

(72) Inventors: Christon Thomas Manzella, Waterford, MI (US); John Baldiga, Oakland, MI (US); John Stephen LeRoy, Birmingham, MI (US)

(73) Assignee: Platform Robotics, Inc., Birmingham, MI (US)

( * ) Notice: Subject to any disclaimer, the term of this patent is extended or adjusted under 35 U.S.C. 154(b) by 752 days.

(21) Appl. No.: 18/156,477

(22) Filed: Jan. 19, 2023

(65) Prior Publication Data

US 2024/0245007 A1 Jul. 25, 2024

(51) Int. Cl.
*A01D 61/00* (2006.01)
*A01D 61/02* (2006.01)

(52) U.S. Cl.
CPC ........... *A01D 61/006* (2013.01); *A01D 61/02* (2013.01)

(58) Field of Classification Search
CPC .................. A01D 61/006; A01G 3/002; A01G 2003/005; A01G 3/0435; A01G 17/023; A01G 17/026
USPC ... 56/330, 130, 126, 328.1, 12.4, 13.9, 14.5, 56/14.6, 16.5, 207, 327.1; 460/126, 134; 209/296, 359, 606; 198/626.1, 690.2, 698
See application file for complete search history.

(56) References Cited

U.S. PATENT DOCUMENTS 2,447,122 A * 8/1948 Horst, Jr. ............... A01D 46/02 56/130
2,750,945 A * 6/1956 Crowley ................ A01D 46/02 460/129
2,888,127 A * 5/1959 Uhlig ..................... B65G 17/32 198/803.14
3,210,917 A * 10/1965 Boyce .................... A01D 45/22 460/134
3,261,152 A * 7/1966 Johnson ............... A01D 51/002 56/328.1
3,536,140 A * 10/1970 Looker ................ A01D 45/008 460/130
3,584,446 A * 6/1971 Bernshausen ............ A01G 3/04 56/236
3,594,995 A * 7/1971 Soules ................... A01D 46/02 56/130

(Continued)

FOREIGN PATENT DOCUMENTS

CN 105379510 A * 3/2016 ............. A01D 46/16
CN 106576585 A * 4/2017 ............. A01D 44/00

(Continued)

OTHER PUBLICATIONS

"Copper Wire Mesh Uses and Applications" Apr. 23, 2021, Micro Mesh, https://www.microwiremesh.com/copper-wire-mesh-uses-and-applications/ (Year: 2021).*

(Continued)

*Primary Examiner* — Joseph M Rocca
*Assistant Examiner* — Sunny D Webb
(74) *Attorney, Agent, or Firm* — Brooks Kushman P.C.

(57) ABSTRACT

Embodiments of the present invention are directed to an apparatus and method for efficiently separating dirt and biomass (leaves, stems, etc.) from more desirable aspects of plant material, with minimal damage to those desirable aspects.

14 Claims, 15 Drawing Sheets

(56) References Cited

U.S. PATENT DOCUMENTS

| | | | | |
|---|---|---|---|---|
| 3,673,774 | A * | 7/1972 | Mizzi | A01D 45/10 56/60 |
| 3,698,171 | A * | 10/1972 | Hecht | A01D 46/00 56/331 |
| 3,857,478 | A * | 12/1974 | Meeusen | B60P 1/6409 198/817 |
| 4,092,991 | A * | 6/1978 | Rohrs | A47L 15/245 134/131 |
| 4,107,902 | A * | 8/1978 | Suggs | A01D 45/16 53/142 |
| 4,174,755 | A * | 11/1979 | Siri | A01D 45/006 56/16.5 |
| 4,702,065 | A * | 10/1987 | Littau | A01D 46/28 198/821 |
| 5,083,417 | A * | 1/1992 | Jeronimidis | A01D 44/00 56/9 |
| 6,811,021 | B1 * | 11/2004 | Corley | B65G 17/30 198/853 |
| 8,381,901 | B2 * | 2/2013 | Yamamoto | B65G 23/08 198/791 |
| 8,642,910 | B2 * | 2/2014 | Pellenc | B07C 5/368 700/223 |
| 8,827,070 | B2 * | 9/2014 | Kalverkamp | B65G 15/52 198/716 |
| 9,788,488 | B2 * | 10/2017 | Bertino | A01D 51/002 |
| 10,524,423 | B1 * | 1/2020 | Olson | A01D 45/065 |
| 10,687,476 | B2 | 6/2020 | Gowa | |
| 10,757,860 | B1 | 9/2020 | Olson et al. | |
| 10,933,424 | B1 | 3/2021 | Zebroski et al. | |
| 11,027,447 | B2 | 6/2021 | Raichart | |
| 2010/0132326 | A1 * | 6/2010 | Berthet | A23N 15/025 56/328.1 |
| 2017/0049054 | A1 | 2/2017 | Molenaar | |
| 2017/0100748 | A1 | 4/2017 | Greenwood | |
| 2020/0260649 | A1 | 8/2020 | Olson et al. | |
| 2020/0338566 | A1 | 10/2020 | Bruggemann | |
| 2021/0045294 | A1 | 2/2021 | Ingram | |

FOREIGN PATENT DOCUMENTS

| | | | | |
|---|---|---|---|---|
| CN | 109454046 | A * | 3/2019 | B08B 3/02 |
| DE | 3424517 | C2 * | 11/1993 | A01D 46/02 |
| EP | 0763320 | A1 * | 3/1997 | A01D 45/008 |
| EP | 1287730 | B1 * | 6/2012 | A01D 17/06 |
| EP | 2868189 | A1 | 5/2015 | |
| KR | 20180123898 | A * | 11/2018 | B07B 1/28 |
| NL | 0109404 | C | 9/1964 | |

OTHER PUBLICATIONS

"All About the Durometer Shore Hardness Scale" Sep. 7, 2021, RapidAxis, (https://rapidaxis.com/blog/durometer-shore-hardness-scale/ ) (Year: 2021).*

"Is Stainless Steel a Good Conductor of Electricity?", JYTSteel, (https://jytsteel.com/blogs/blog/is-stainless-steel-a-good-conductor-of-electricity-3) (Year: 2025).*

Greenbroz M+ Dry Trimmer from Web Archive May 18, 2022: http://web.archive.org/web/20220518170722/https://www.greenbroz.com/mplus.

Mobius M108S Trimmer from Web Archive Oct. 21, 2022: http://web.archive.org/web/20221021120544/https://mobiustrimmer.com/cannabis-automation/m108s-bud-trimmer/.

Vivosun 19 inch Bowl Trimmer from Web Archive Nov. 29, 2022: http://web.archive.org/web/20221129080329/https://vivosun.com/vivosun-19-inch-bud-leaf-bowl-trimmer-658820960379615341-v588209603796153 31.

Centurion Pro Solutions Trimmers from Web Archive Jan. 24, 2022: http://web.archive.org/web/20220124191738/https://cprosolutions.com/.

Vevor 18 inch Hydroponic Trimmer from Web Archive May 19, 2022: http:/web.archive.org/web/20220519181751/https://www.vevor.com/bowl-leaf-trimmer-c_10209/18-electric-trimmer-hydroponic-trimmer-adjustable-speeds-leaf-bud-trim-reaper-p_010491583969.

Triminator Trimmers from Web Archive Nov. 27, 2022: http://web.archive.org/web/20221127074243/https://thetriminator.com/marijuana-hemp-trimming-machines/.

Twister Technologies Trimmers from Web Archive Jun. 26, 2022: http://web.archive.org/web/20220626204005/https://www.twistertrimmer.com/twister-t4-trimmer/#systems?gaconnectorId=c203157a-8487-4c02-d82a-fd8adc876f98.

International Search Report for for PCT/US2024/11822; dated Jun. 4, 2024; 11 pages.

* cited by examiner

DELEAFING APPARATUS AND METHOD

TECHNICAL FIELD

Embodiments of the present invention are directed to an apparatus and method for efficiently removing unwanted leaves and debris from more desirable aspects of plant material with minimal damage to those desirable aspects.

BACKGROUND

Removing unwanted leaves and debris from more desirable aspects of a plant, e.g., the flower, often involves manually handling or mechanically processing the plant in a manner that under-trims, over-trims or damages the desirable plant material.

Manually cleaning and trimming plant material is a slow and labor-intensive process. Long-term manual trimming may also include repetitive hand and wrist motion, potentially leading to negative health impacts including but not limited to carpal tunnel syndrome.

Mechanical trimming systems exist to automate plant cleaning and trimming operations. But due to their design, they are not as effective and efficient as embodiments of the present invention and they often cause unnecessary damage to the desirable plant material, thereby reducing its value. In addition, the existing systems do not adequately preserve the integrity of desirable aspects of the plant, or adequately separate desirable aspects of the plant from less desirable trim material.

What is needed is an automated trimming apparatus and method that maximizes the removal of non-desirable plant material, minimizes the removal of desirable plant material, and minimizes any damage to desirable plant material during the trimming operation.

SUMMARY

One embodiment of the present invention includes an apparatus for deleafing plant material. The apparatus may include a first array of compliant protrusions extending from a first substrate, and a second array of compliant protrusions extending from a second substrate. The second array of compliant protrusions may be positioned opposite at least a portion the first array of compliant protrusions. In one example, the compliant protrusions have a shore durometer in the range of 45-70.

The apparatus may include a drive motor configured to translate the first substrate and the first array of compliant protrusions in a first direction at a first rate relative to the second substrate and the second array of compliant protrusions.

The apparatus may also include a separator having a plurality of separating members positioned one or more distances from each other to define at least one separator distance between the plurality of separating members to separate larger plant material from smaller plant material.

The apparatus may additionally comprise another drive motor configured to translate the second substrate and the second array of compliant protrusions in the first direction at a second rate.

The apparatus may additionally comprise another drive motor configured to translate the second substate and the second array of compliant protrusions in a direction orthogonal to the translation of the first substrate and the first array of compliant protrusions.

The first or second substrates may be configured as a belt having the array of compliant protrusions, and the first or second drive motors may be powered rollers to rotate the belt. The apparatus may also include one or more belt tensioners for tensioning the belt(s).

The plurality of separating members may comprise a plurality of separator belts. Another drive motor may rotate at least some of the plurality of separator belts to propagate plant material toward an output. A plurality of agitator protrusions may be configured to agitate the plant material as the separator belts propagate the plan material toward the output.

In another configuration, the separating members may comprise two or more spindles. Another drive motor may rotate the two or more spindles to propagate plant material toward an output. One or more of the spindles may include a helical protrusion.

The apparatus may additionally comprise a frame configured to separate the first substrate and the second substrate by an adjustable distance to set an interference or gap between the first and second array of protrusions. The apparatus may also include an input conveyor to translate plant material toward the first and second array of compliant protrusions. The apparatus may also include one or more grounding electrodes contacting at least a portion of the compliant protrusions to discharge static electricity from the compliant protrusions.

Another embodiment of the present invention includes a deleafing belt comprising a belt substrate having a loop length, and a width between two belt edges. The belt may include an array of compliant protrusions extending outwardly from the substrate. The protrusions may have a shore durometer in the range of 45-70. The belt may include a side wall protrusion extending outwardly along each belt edge and along the length of the belt. The siderail may include a plurality of slits to facilitate rotation of the siderail around a roller. The belt may be divided into two or more belt segments, which may be interconnected with two or more belt pin rods.

Another embodiment of the present invention includes a method of deleafing plant material. The method includes translating a first array of compliant protrusions extending from a first substrate in a first direction at a first rate. The method additionally includes translating a second array of compliant protrusions extending from a second substrate in the first direction at a second rate. The method may additionally include oscillating the second array of compliant protrusions at a third rate in a direction orthogonal to the first direction. The method may additionally include inputting plant material between the first and second array of compliant protrusions to remove trim material from the plant material as the protrusions translate and oscillate. The method may additionally include separating the plant material from the trim material. The first rate, the second rate and the third rate may be independently adjustable to define a rolling pattern for the plant material as the compliant protrusions propagate the plant material from an input to an output.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
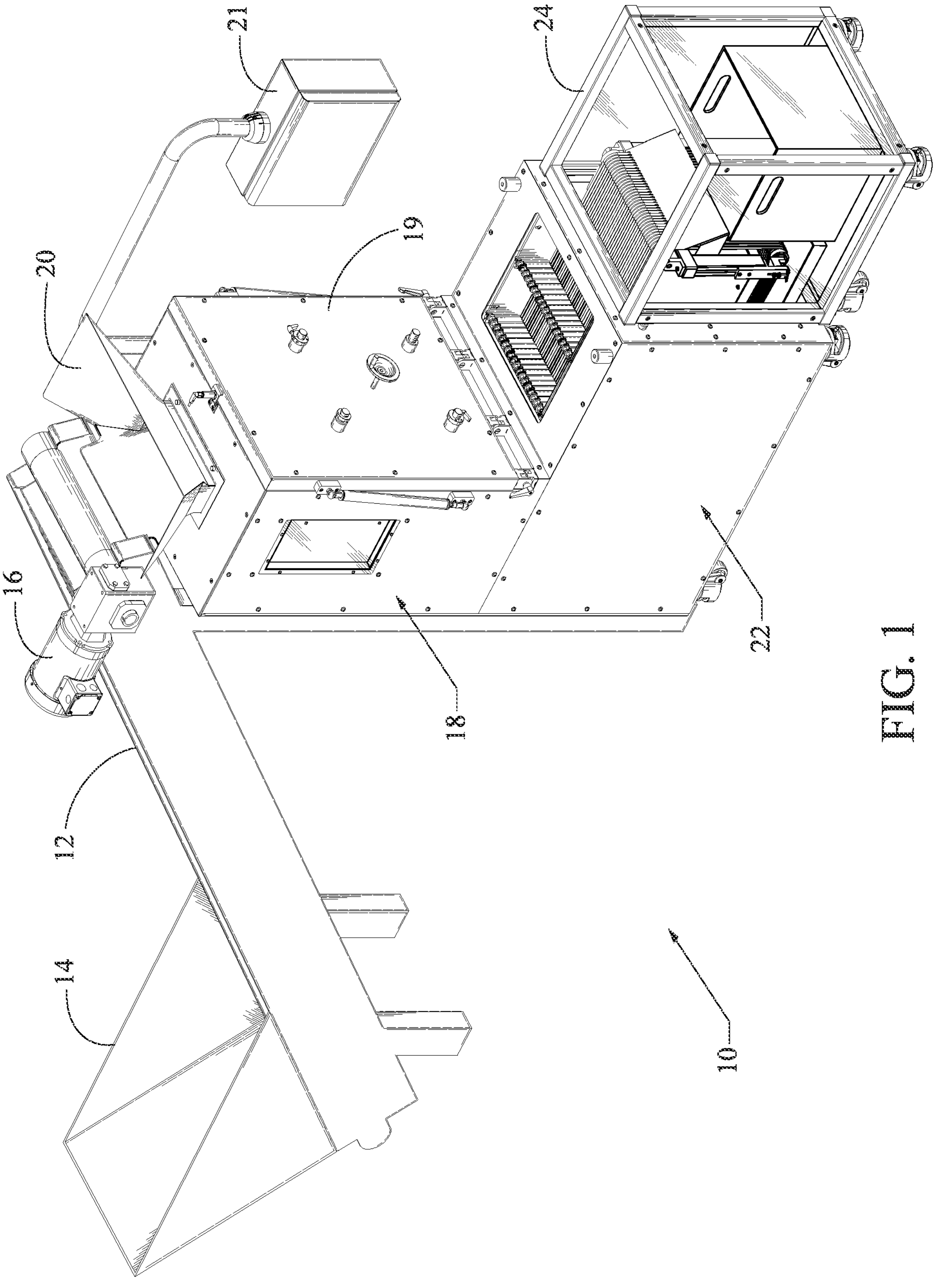
FIG. 1 is a perspective view of a deleafing assembly in accordance with a preferred embodiment of the present invention.

FIG. 1 is a perspective view of one embodiment of a deleafing system assembly 10 according to one embodiment of the present invention. Those of skill in the art will appreciated that the term "deleafing" as used herein is not limited to the removal of leaves but refers more generally to the removal or separation of undesirable plant material from desirable plant material. Undesirable plant material may include unwanted leaves, stems, dirt, bugs and any other aspect or attachment to a plant that is undesirable.

Assembly 10 includes a feeder conveyor 12 including hopper 14 and drive motor 16 for receiving and conveying plant material to the input hopper 20 of deleafing apparatus 18. Deleafing apparatus 18 includes service door 19 and human-machine-interface (HMI) 21. Separator assembly 22 is located beneath deleafing apparatus 18. In this example, separator assembly 22 outputs processed plant material to output cart 24. Alternatively, additional processing/separating conveyors (not shown) may be implemented to translate and/or separate plant material processed by deleafing apparatus 18.

Figure 2:
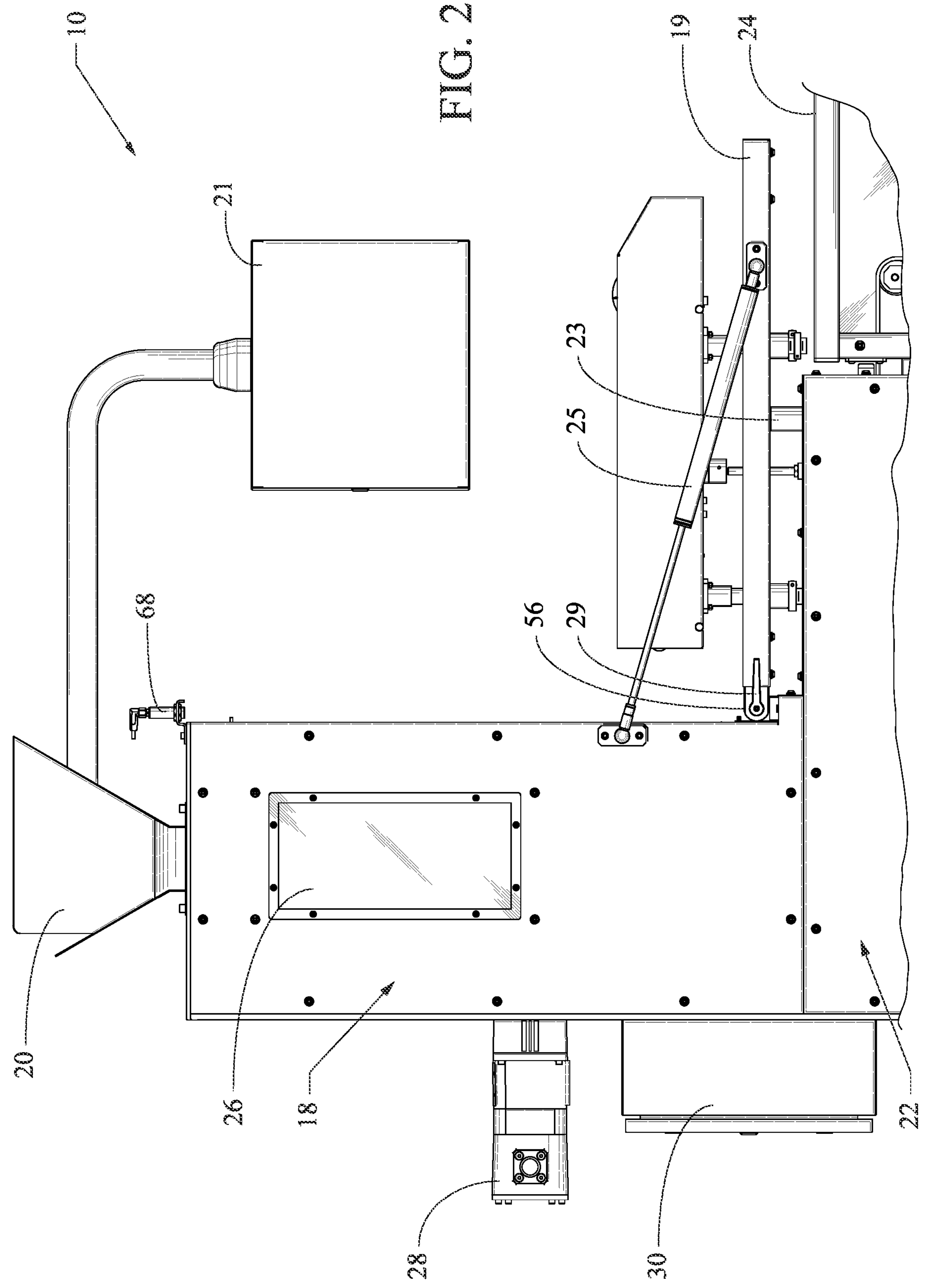
FIG. 2 is a side view of a deleafing system in accordance with a preferred embodiment of the present invention.

FIG. 2 is a side view of an embodiment of deleafing system assembly 10, including deleafing apparatus 18, input hopper 20, HMI 21, viewing window 26, oscillation motor 28, and electrical service panel 30. Service door 19 is hinged to deleafing apparatus 18 at hinge 56, which includes a stop clamp 29 for clamping the hinge in a desirable position. In this embodiment, service door 19 is shown in the open position enabling access into deleafing apparatus 18 for service, adjustments, cleaning, belt removal/replacement, etc. Hydraulic or pneumatic shock absorbers 25 assist in opening and closing service door 19. Rubber stop(s) 23 prevent the exterior of service door 19 from contacting the top surface of the separator assembly 22. Limit switch 68 detects if the service door is, or is not, in the fully closed position. According to one embodiment, mechanical operation of the deleafing apparatus 18 may be suspended any time the limit switch 68 detects that service door 19 is open.

Figure 3A:
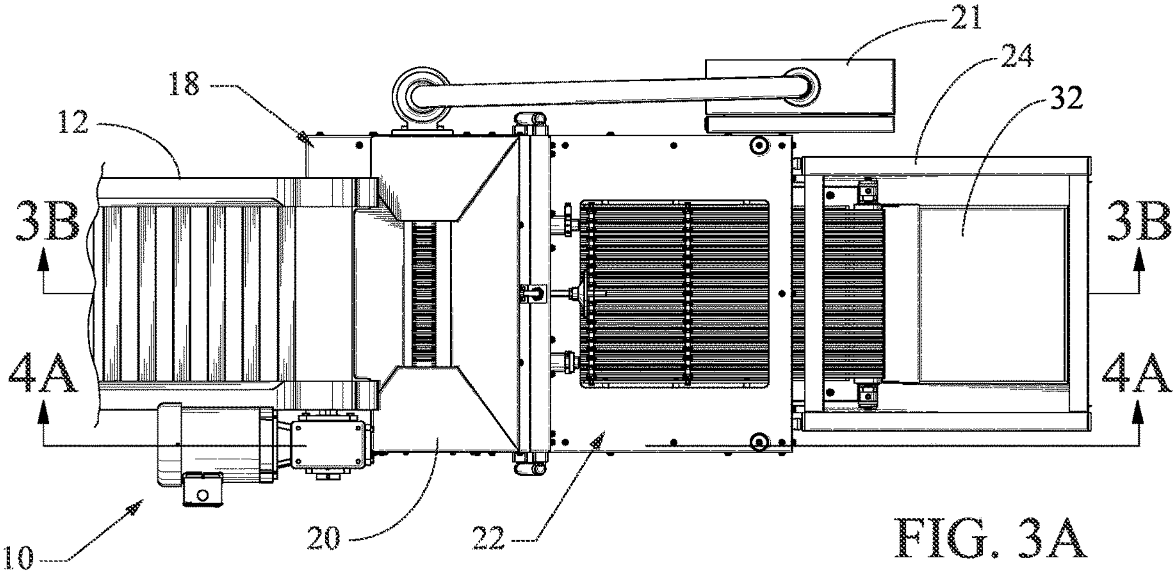
FIG. 3A is a top view of a deleafing system in accordance with a preferred embodiment of the present invention.
Figure 3B:
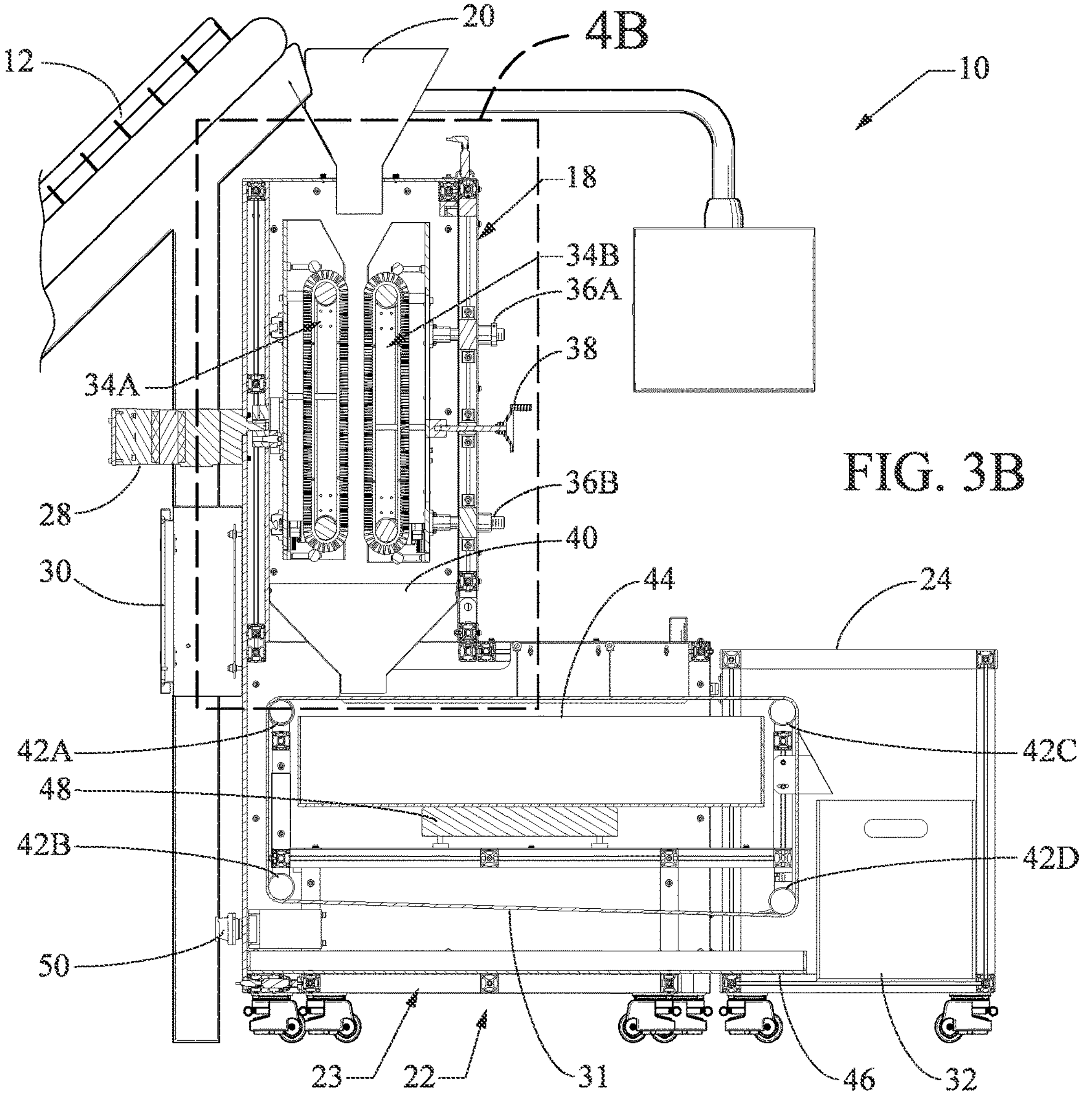
FIG. 3B illustrates a cross-sectional view of the assembly 10 along cut line 3B illustrated in FIG. 3A.

FIG. 3A illustrates a top view of assembly 10 showing conveyor assembly 12, deleafing apparatus 18 having input hopper 20, HMI 21, separator assembly 22, cart 24 and output basket 32. FIG. 3B illustrates a cross-sectional view of the assembly 10 along cut line 3B illustrated in FIG. 3A. The cross-section includes conveyor assembly 12, deleafing apparatus 18, separator assembly 22 and output cart 24. Deleafing apparatus 18 includes input hopper 20, HMI 21, belt assemblies 34A and 34B, linear bearing and lockring assemblies 36A and 36B, spacing adjustment dial 38, and output chute 40.

Separator assembly 22 includes separator cart assembly 23 having a plurality of spaced separator conveyor belts 31 rotating about rollers 42*a-d*. At least one of rollers 42 is an electrically driven roller having variable speed control. In a preferred embodiment, one or more of rollers 42A-D are made of an electrically conductive material to discharge to ground static charge that may accumulate on separator conveyor belts 31. Separator cart assembly 23 also includes a removeable bin 44 for receiving plant material that passes through the spacing between separator belts 31. Separator cart assembly 23 may also include a lower separator bottom bin 46 for capturing trim material that adheres to separator belts 31 as they rotate about rollers 42A-D. Separator cart assembly 23 may also include scale 48 for indicating the weight of trim located within trim bin 44. Separator cart assembly may also include output cart 24 including one or more output bins 32 for receiving desirable trimmed plant material from the separator assembly 22.

Separator cart assembly 23 may also include electrical connector 50 for connecting any necessary power, data and/or sensor connections. For example, power from electrical panel 30 is provided through connector 50 for driving separator belts 31 and powering scale 48. A ground circuit is provided for discharging static electricity generated by separator belts 31 collected at separator cart assembly 23, and a data connection is provided for transmitting a weight value from scale 48 to HMI 21. In addition, proximity switches (not shown) detect the proper installation or absence of separator cart assembly 23 and/or output cart 24.

Figure 4B:
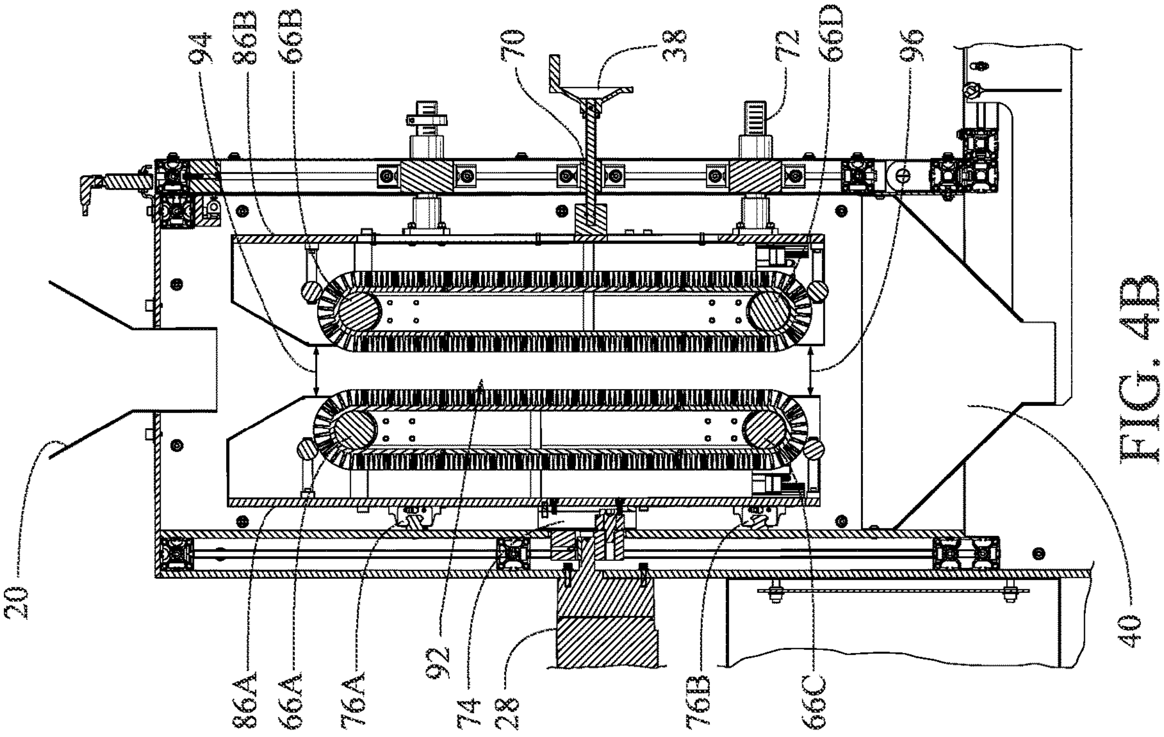
FIG. 4B is an exploded view of region 4B identified in FIG. 3B.
Figure 4A:
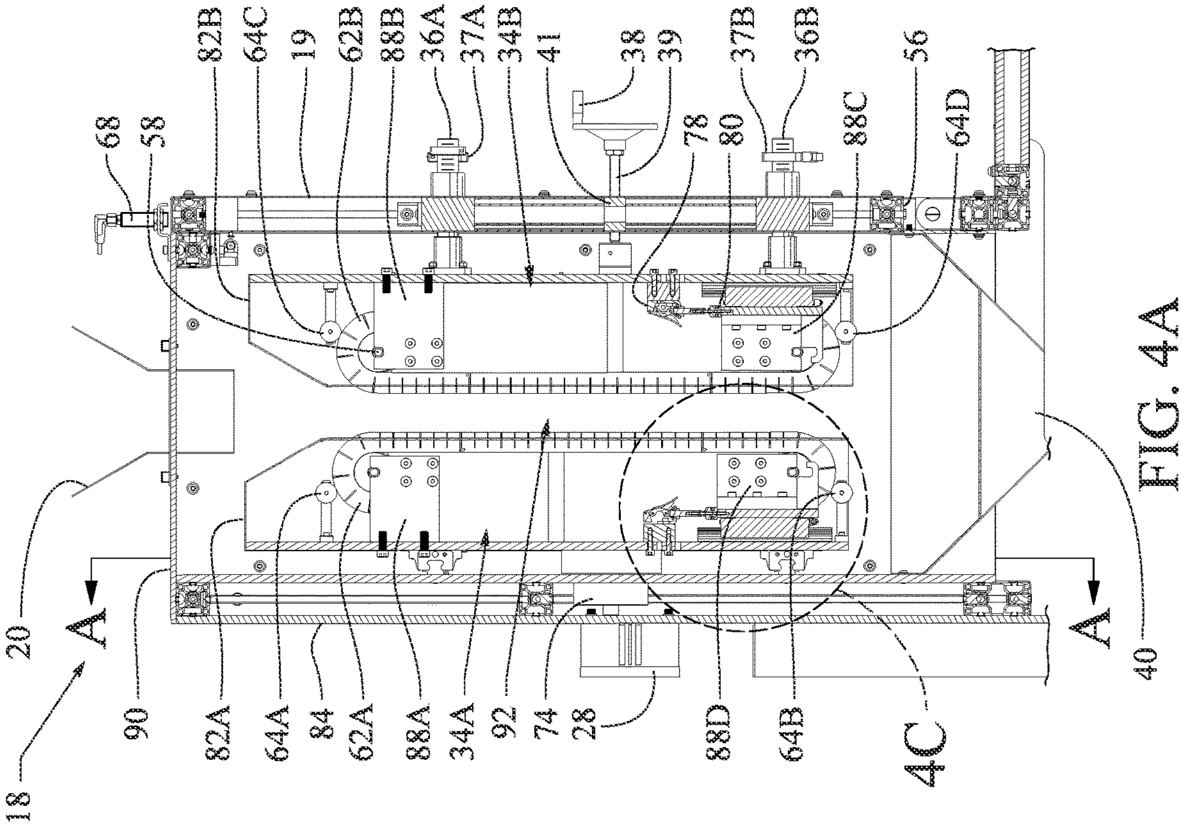
FIG. 4A is a side view of components of the deleafing assembly in accordance with a preferred embodiment of the present invention.

FIG. 4A is a section view of the internal components of deleafing apparatus 18 along section line 4A illustrated in FIG. 3A in accordance with an embodiment of the present invention. FIG. 4B is an exploded view of region 4B identified in FIG. 3B. In the example depicted in FIGS. 4A and 4B, deleafing apparatus 18 includes upper powered rollers 66A and 66B and lower follower rollers 66C and 66D. Alternatively, lower rollers 66 C/D may be powered and upper rollers 66A/B may be follower rollers. Example powered rollers include but are not limited to PULSE-ROLLER Part No. PR-WD-48-396-15AMAB. Example follower rollers include but are not limited to PULSEROLLER Part No. FR-W0-48-396A9AY.

One or more of rollers 66A-D may be configured with a conductive exterior, e.g., stainless steel, for discharge to ground of static electricity that has accumulated on deleafing belts 62 A/B. Rollers are preferably washdown-grade having sealed bearings that can withstand washdown for cleaning purposes. In one embodiment, rollers may be equipped with one or more tracking sleeves, or crowned coating (not shown) for alignment and grip of deleafing belts 62A and 62B. Tracking sleeve(s) and coating(s) are preferably of an anti-static material and may also be configured with grounding contacts to discharge static electricity accumulating on belts 62 A/B.

Deleafing apparatus 18 includes frame 84 supporting roller backplate 86A through linear slides 76A and 76B, and roller backplate 86B through linear bearings 36A and 36B. Example linear slides 76 A/B include but are not limited to THK Part No. HSR20A2SSHHC1M and 460LM (G20g20, B-M6F). Example linear bearings 36A/B include but are not limited to MISUMI Part No. SLHIFCS25H (sleeve) and PR220801-0100-043 (graduated shaft). Backplates 86A and 86B support deleafing roller assemblies 34A and 34B through upper roller supports 88A and 88B, and lower roller supports 88C and 88D.

Deleafing apparatus 18 includes top cover 90 through which unprocessed plant material is introduced through input hopper 20. The apparatus 18 also includes deleafing belt covers 82A and 82B. Top cover 90, hopper 20 and belt covers 82A/B direct unprocessed plant material to the deleafing area 92.

Linear bearings 36 A/B permit adjustable horizontal travel of roller assembly 34B relative to roller assembly 34A, to define spacing 94/96 (or interference) between the agitation protrusions of the belts 62A/B. Lockrings 37A/B adjustably maintain the position of the linear bearings to the desired spacing. In one embodiment, spacing 94 at the upper end of deleafing area 92 may be greater than spacing 96 at the lower end of deleafing area 92 to introduce a vertical pitch to roller assembly 34A ensure plant material is effectively received into the deleafing area at spacing 94 and adequately processed at spacing at an effective rate before the plant material exits deleafing area 92.

One or more spacing adjustment cranks 38 including threaded shaft 39 through threaded frame casing 41 permits adjustment of roller assembly 34B to set spacing 92 relative to roller assembly 34A. In an alternative configuration, separate upper and lower spacing adjustment dials are implemented to achieve the desired pitch of roller assembly 34A relative to roller assembly 34B.

As described in greater detail below, belt assembly 34A may translate horizontally on slide bearings 76A/B relative to belt assembly 34B. Translation of belt assembly 34A is driven by oscillation motor 28, which operates an offset cam and follower yoke assembly 74 as described in greater detail below. Example oscillation motor 28 includes but is not limited to BODINE model 3216.

In this embodiment, each belt assembly 34A/B includes upper and lower grounding bars 64A-D for discharging static electricity that accumulates on deleafing belts 62A/B. Grounding bars are electrically connected to an electrical ground (or ground buried rod) connected to assembly 10. Alternatively or additionally, one or more ionizers such as a fan driven or air pressure driven ionizer may be implemented to help reduce static electricity that may build up in belt assemblies 34 A/B.

Figure 4C:
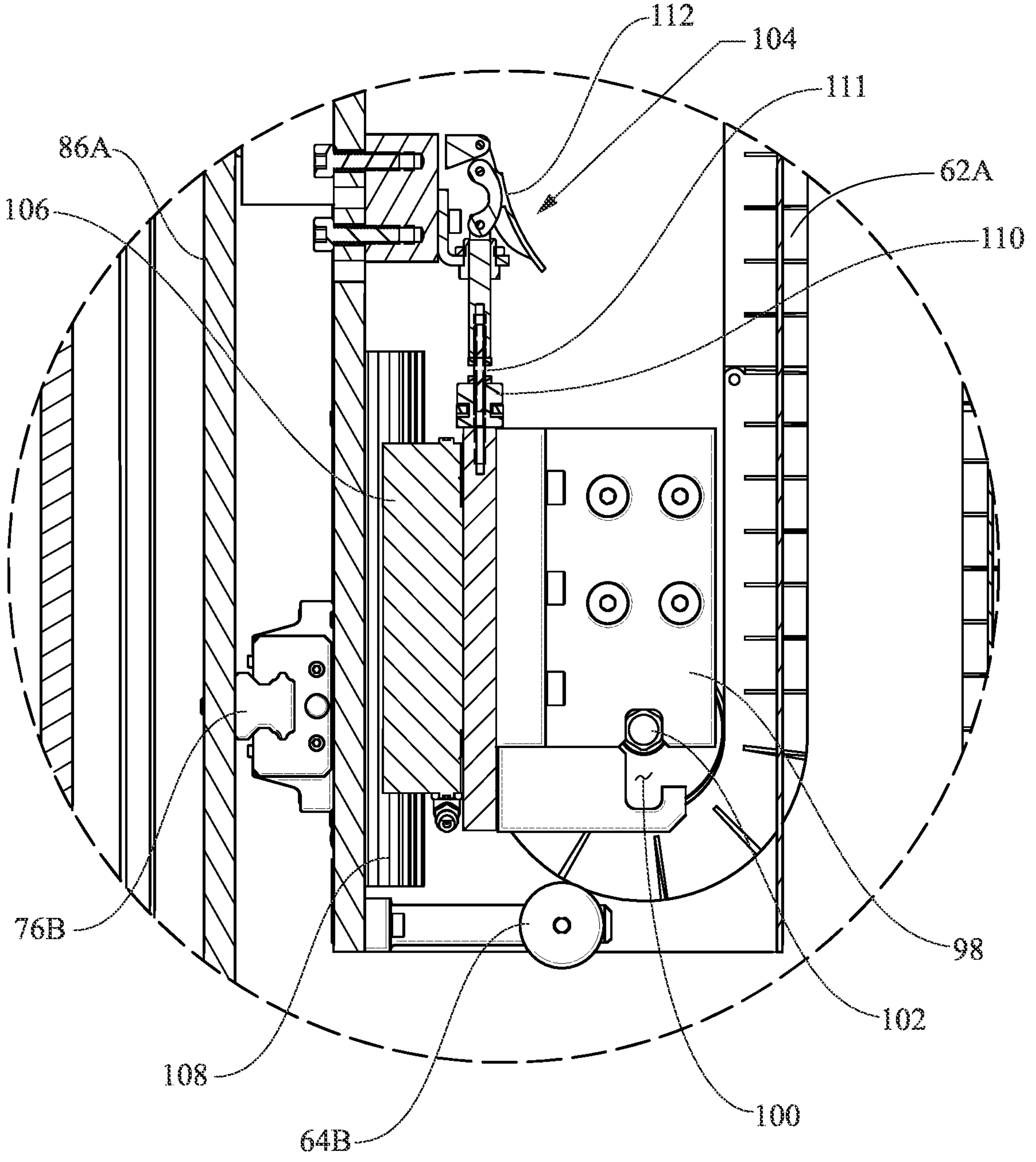
FIG. 4C illustrates in greater detail region 4C of belt assembly 34A depicted in FIG. 4A.

FIG. 4C illustrates in greater detail region 4C of belt assembly 34A depicted in FIG. 4A. Belt assemblies 34A/B may include lower brackets 98 defining a bayonet C-slot 100 for receiving and retaining lower roller axis shaft 102. Lower bracket 98 is affixed to linear follower 106, which travels vertically along linear guide 108. An example linear guideway slide includes THK Part No. HSR20LR1SSHHC1M+160LM (G20g20, B-M6F). Tensioner assembly 104 may include a straight-line action clamp assembly, for example, DESTACO Part No. 6001-MSS. Action clamp 104 is shown in the actuated and tensioned position to apply fixed but releasable downward pressure on bracket 98 and lower roller axis 102 through upper bayonet slot 100, thereby tensioning belt 62A. Fine adjustment of belt tension is achieved by adjustment of nut 110 on threaded shank 111 of straight action clamp 104. Belt removal is accomplished by releasing handle 112 of straight action clamp 104 to release tension on bracket 98 and thus lower roller axis 102. This permits lower roller axis 102 to be removed through the opening in bayonet slot 100, which permits removal of belt 62 from lower roller 66C/D. With belt tension removed, upper rollers 66A/B may be removed from upper roller axis slots 58, thereby permitting removal of the belts 62A/B from rollers 66A-D.

Figure 5:
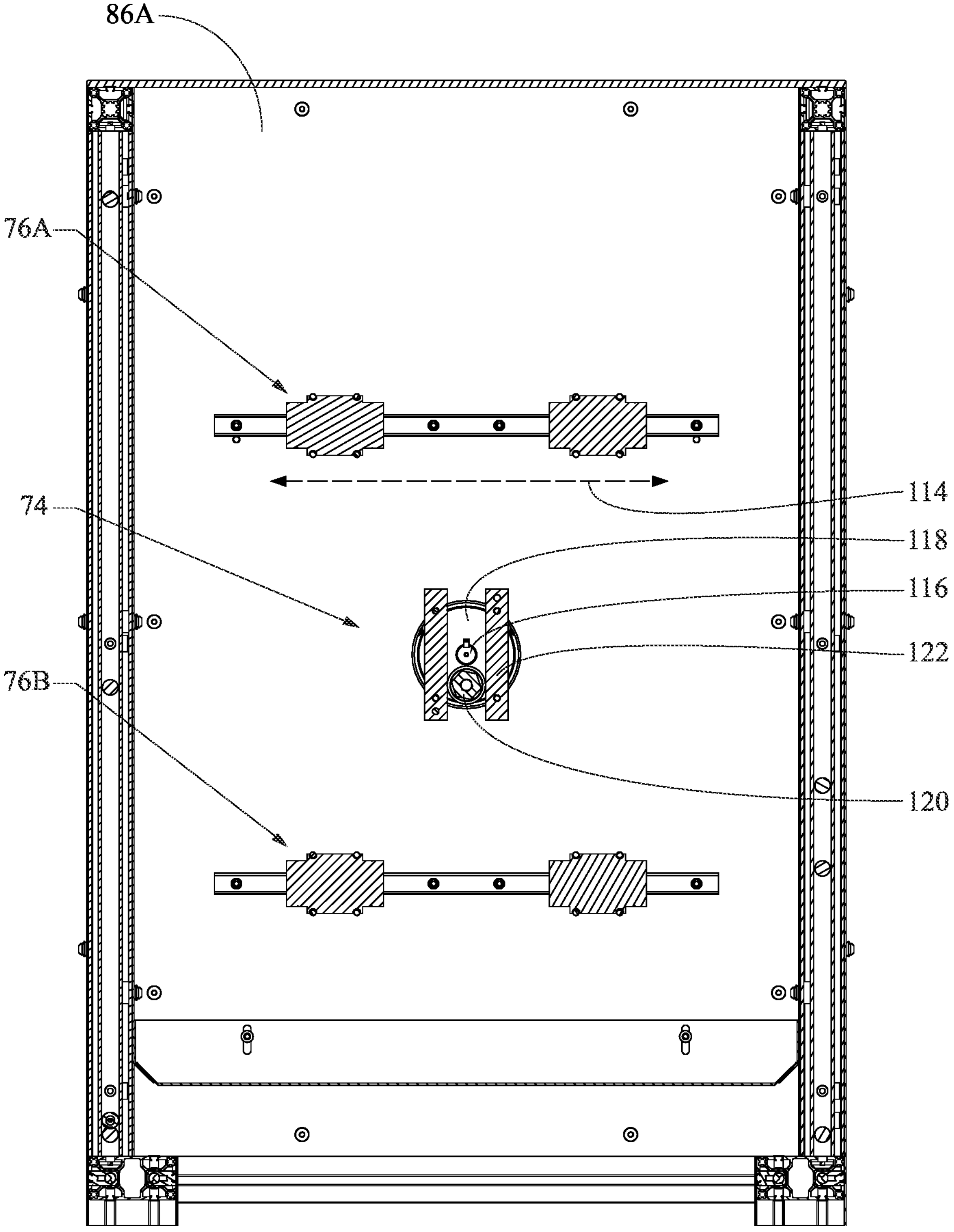
FIG. 5 illustrates a cross-sectional along cut line A-A illustrated in FIG. 4A.

FIG. 5 illustrates a cross-sectional along cut line A-A illustrated in FIG. 4A. Backplate 86A includes linear guideway assemblies 76A/B and cam/roller assembly 74. Cam/roller assembly 74 causes lateral translation 114 of backplate 86A relative to the vertical rotation of deleafing belts 62A/B. Cam/roller assembly 74 includes shaft 116 driven by motor 28, cam wheel 118, cam follower roller bearing 120, and cam guide 122. During operation, rotation of cam wheel 118 by motor 28 through shaft 116 drives circular rotation of cam follower roller bearing 120 about motor shaft 116. During rotation, cam follower roller bearing 120 applies lateral pressure on the interior surfaces of cam guide 122, thereby causing lateral translation of backplate 88D along linear guideways 76A/B.

Figure 6A:
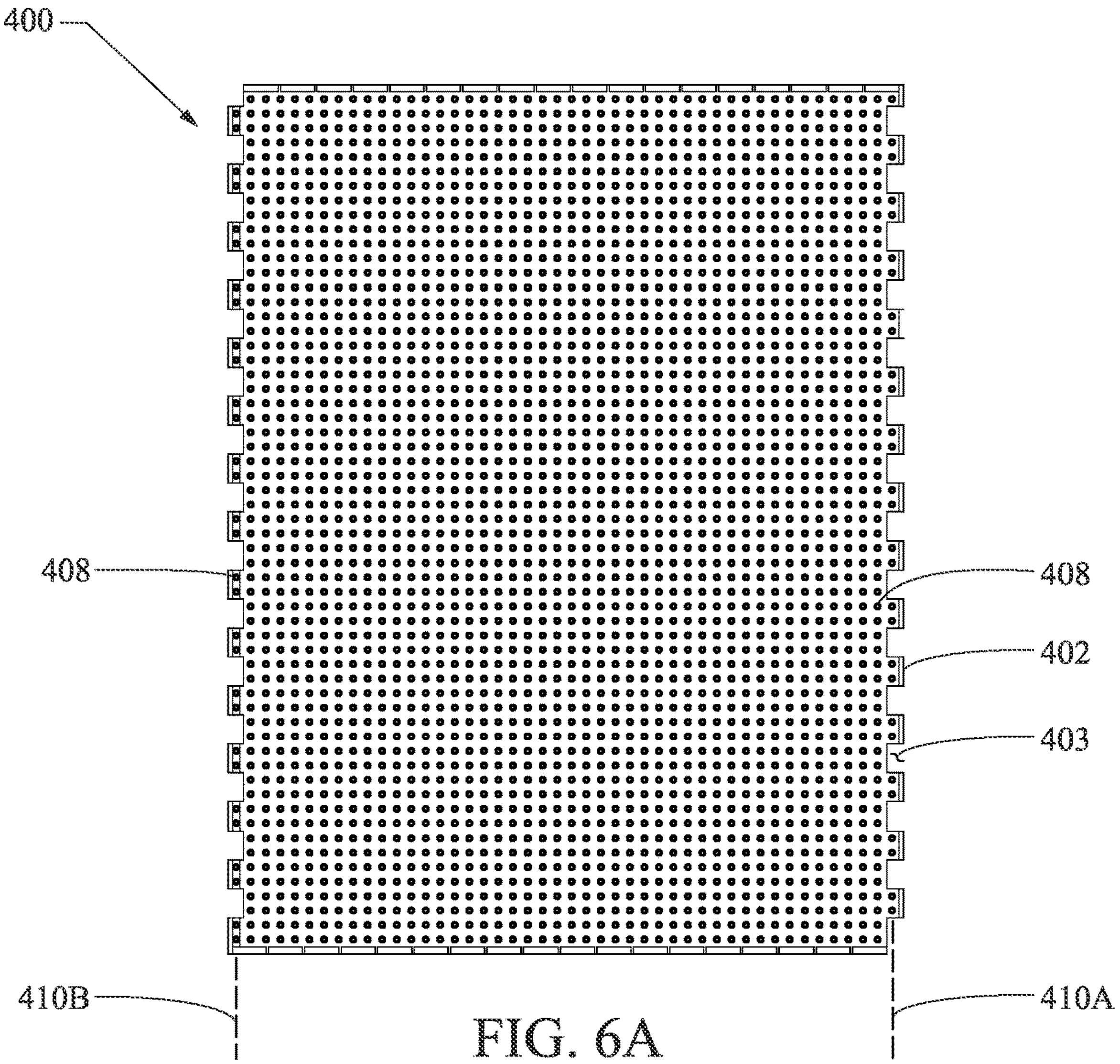
FIG. 6A illustrates a front view of a deleafing belt segment in accordance with a preferred embodiment of the present invention.
Figure 6B:
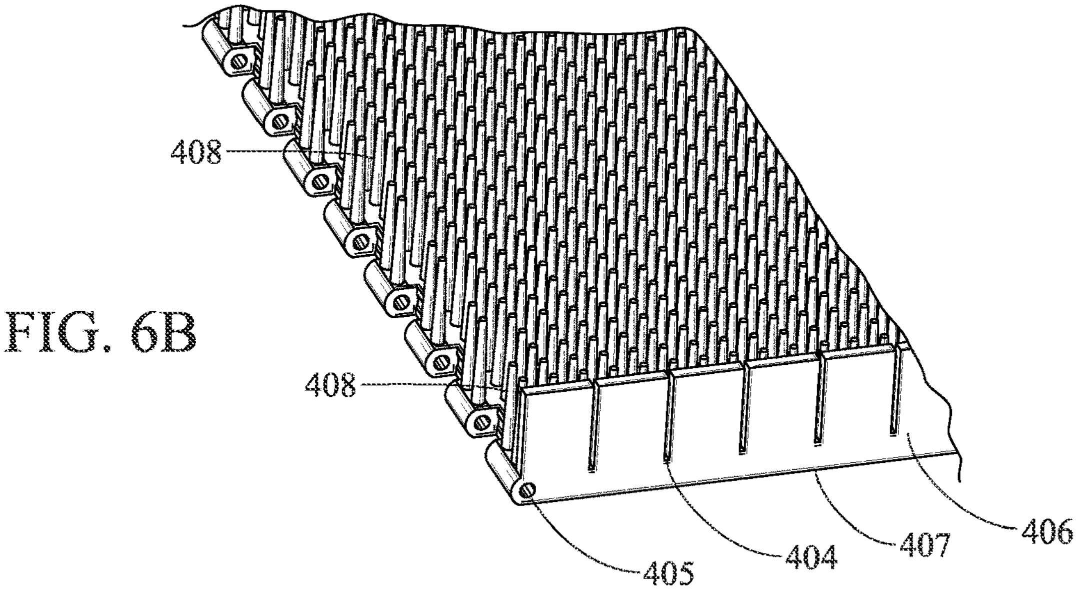
FIG. 6B illustrates a perspective view of a deleafing belt segment in accordance with a preferred embodiment of the present invention.
Figure 6C:
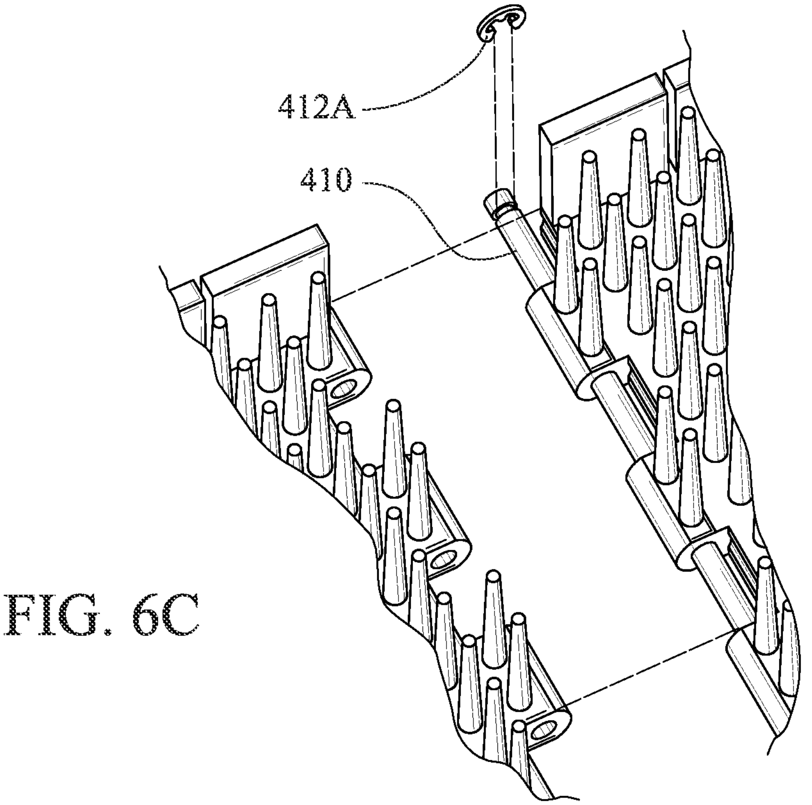
FIG. 6C illustrates a perspective view of a belt segment threading rod in accordance with a preferred embodiment of the present invention.

FIGS. 6A-D illustrate aspects of deleafing belts 62A/B in accordance with a preferred embodiment of the present invention. The geometries and configurations illustrated in the figures are examples and other configurations may be implemented. As shown in FIGS. 6A and 6B, deleafing belt 62A/B may comprise one or more segments 400. In an alternative embodiment, the belt may be a single unitary structure. Belt segment may include a substrate backing 407 and an array of compliant agitator protrusions 408 illustrated in more detail in FIG. 6D. Belt segment 400 additionally comprises offset interfaces having axes 410A and 410B.

According to one embodiment, belt segment interfaces 410A and 401B have offset protrusions 402 and notches 403. Protrusions 402 include through-hole 405 through which threading rod 410 illustrated in FIG. 6C may be inserted to interconnect belt segment interfaces 410A and 410B. Preferably, threading rod 410 comprises stainless steel or other food grade material of sufficient strength for interconnecting belt segments 400. Threading rod 410 may be adapted with rod end clips or caps 412A or other rod end structure to prevent threading rod 410 from sliding out of its desired position relative to belt segment 400 along axes 410A and 410B.

Protrusions 402 and notches 403 preferably include a clearance in the direction of axis 410A and 410B to permit rotation of protrusions 402 and notches 403 relative to one another about threading rod 410. As shown in FIG. 6A, protrusions 402 preferably include one or more agitator protrusions 408 to maintain consistency in the array and to avoid gaps or spaces along axis 410A and 410B.

As shown in FIG. 6B, belt segment 400 may include sidewalls 406 to assist in maintaining plant material within the processing region of the belt segment where the array of agitator protrusions 408 are located. Sidewalls 406 may comprise the same compliant materials as agitator protrusions 408. Sidewalls 406 may include slits 404 to assist the rotation of sidewalls about rollers 66A-D.

According to one example, the material composition of segment 400 may include a compliant material having a Shore A durometer in the range of approximately 45-70. An example material specification is DOW XIAMETER RBB-2400-50 comprising silicon rubber having a tensile strength of approximately 11 MPa, a break elongation of approximately 500%±100%, and a tear strength of approximately 24 kN/m±2 kN/m. Preferably, the material comprising deleafing belt can withstand temperatures sufficient for sterilization in an autoclave or other high-temperature cleaning apparatus and may comprise a material that can withstand the application of alcohol or other cleaning solution.

While FIGS. 6A and 6B illustrate one or more interconnecting belt segments 400, deleafing belts 62A/B may alternatively comprise a unitary belt structure lacking interfaces 410A and 410B and connecting rod(s) 10, other belt material compositions and specifications may be utilized. For example and without limitation, an increased or decreased durometer may be implemented.

Figure 6D:
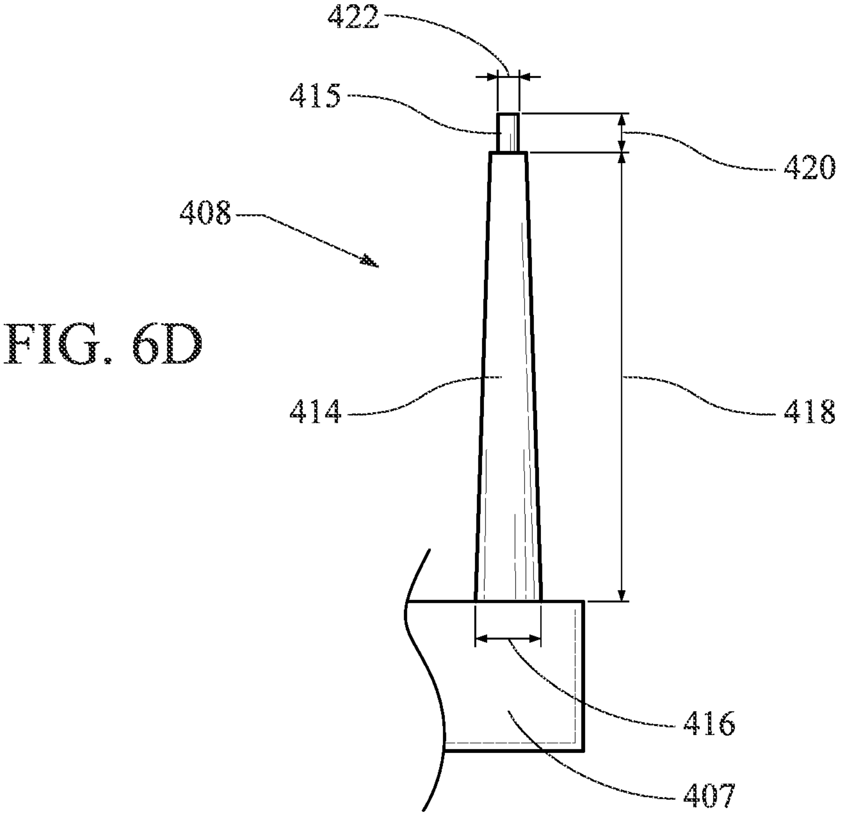
FIG. 6D illustrates a cross-section of a deleafing belt protrusion in accordance with a preferred embodiment of the present invention.

FIG. 6D illustrates an example protrusion 408 in accordance with a preferred embodiment of the present invention. In this example, protrusion 408 has a body section 414 having a generally conical cross-section with a height 418 substantially greater than a bottom width 416. In an alternative embodiment (not shown), protrusion body 414 may have a cylindrical body cross-section with a generally fixed width. Other geometries may be implemented. Protrusion 408 may also include a tip section 415 having a geometry different than the body section 414. In this example, tip section has a cylindrical cross-section having a height 420 and diameter 422. Alternatively, tip section 415 may be conical having a pointed end (not shown). In other embodiments agitator protrusions 408 may comprise varying lengths, cross-sectional geometries and/or compliances. In addition, belt assembly may be implemented with, or applied upon, varying surface contours and pitch to further assist in the deleafing/cleaning process.

Figure 7A:
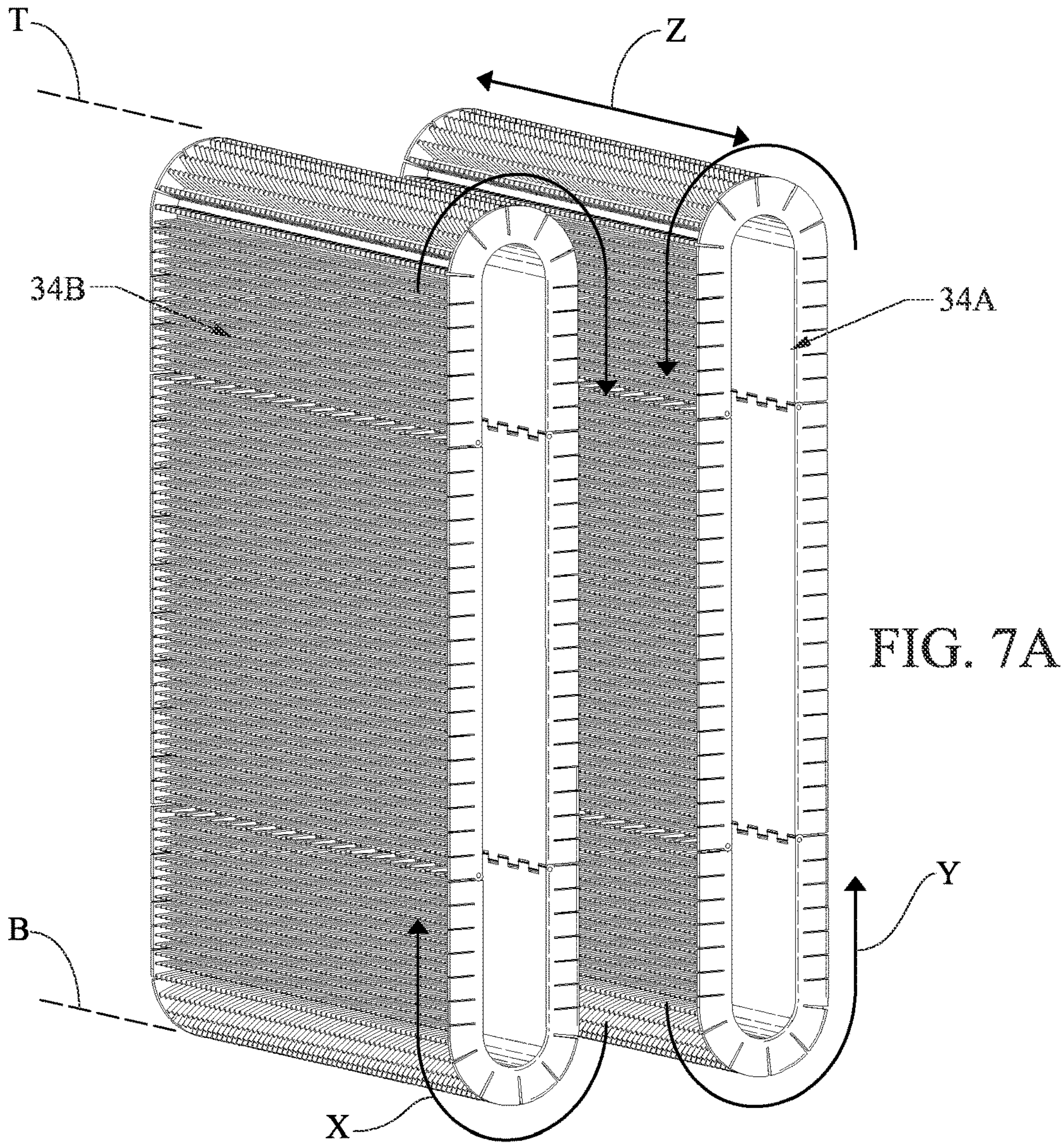
FIG. 7A is a perspective view depicting relative movement of deleafing belt assemblies in accordance with a preferred embodiment of the present invention.

FIG. 7A is a perspective view depicting relative movement of deleafing belt assemblies 34 A and B in accordance with an embodiment of the present invention. In this example, belt assembly 34 A rotates clockwise at rate X, while belt assembly 34 B rotates counterclockwise at rate Y, and while belt assembly 34 B translates back and forth in a transverse direction at rate Z. Rotation rates X and Y control the rates of powered rollers 66 A and B. The speed of oscillating motor 28 controls translation rate Z.

By setting rates X, Y, and Z, the rolling rate and rolling direction of the plant material to be deleafed may be controlled. For example, setting rotation rate X greater than rotation rate Y will ensure that the material rolls vertically between the deleafing belts 62A and 62B as the plant material travels from the top ("T") of the system to the bottom ("B"). This helps to ensure that all surfaces of the plant material are evenly contacted by the protrusions 108 of deleafing belts 62A and 62B. Translation rate Z controls the speed by which belt assembly 34B oscillates back and forth in a direction orthogonal to the direction of belt rotation, causing the plant material to be deleafed to roll back and forth in a transverse direction Z while it travels from the top ("T") of the system to the bottom ("B"). A lower translation rate Z will result in less translational rolling of the plant material. A higher translation rate Z will result in more translational rolling of the plant material.

An example control system for the HMI and the drive motors described above includes a PC using, e.g., a TCP/IP (Modbus) connection with remote input/output drivers. These drivers read the state of sensors, write discreet outputs, and write varying DC voltage (analog) to the motor speed controllers. Other control architectures may be implemented including but not limited to discrete controllers, manual switches, and potentiometers. HMI is preferably includes a touch screen for displaying and manually controlling the speed of the individual drive rollers, and for saving, naming and selecting various preset motor speeds. As explained above, optimal motor speeds may vary based on various characteristics of the plant material to be processed including but not limited to the size, plant type, and moisture content.

Figure 7B:
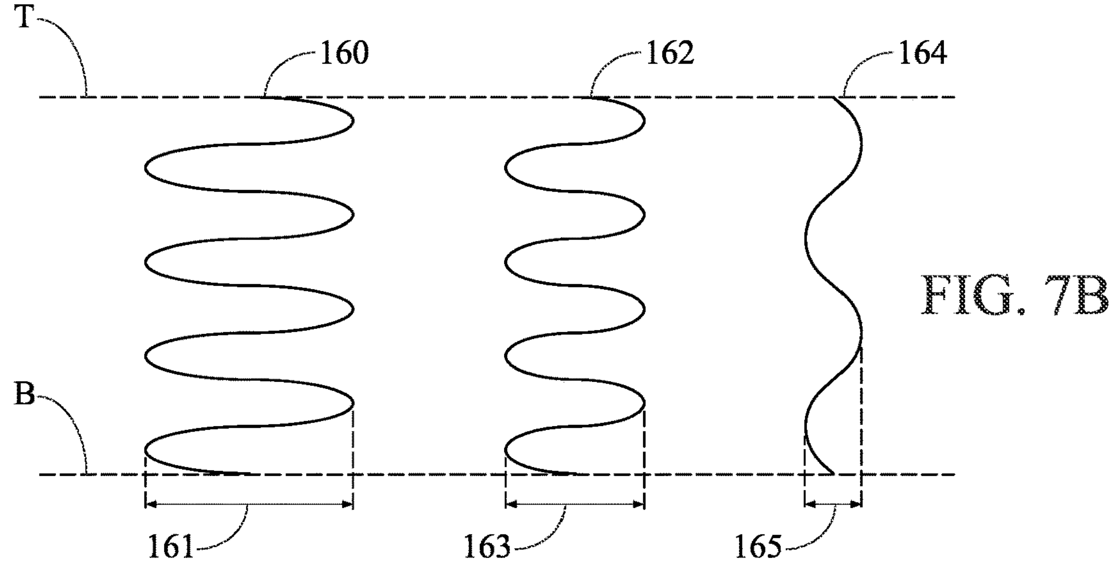
FIG. 7B illustrates example rolling patterns for plant material between belt roller assemblies in accordance with a preferred embodiment of the present invention.

FIG. 7B illustrates example rolling patterns for plant material as it travels from the top ("T") of the system to the bottom ("B") between belt roller assemblies 34A and 34B in FIG. 7A. Pattern 160 has a higher translation rate Z than that of rolling patterns 162 and 164, leading to larger transverse displacement 161. Pattern 160 also has a higher differential between rotation rates X and Y, causing more vertical translation as the material travels from the top ("T") of the system to the bottom ("B"). The depicted patterns 160-164 are merely examples. A wide variety of roll patterns may be achieved by varying settings for X, Y and Z. In addition, pre-defined values for X, Y and Z may be stored in memory of a controller for user-selection depending on the plant material to be processed, or user preference for optimal deleafing operation.

FIGS. 3 through 7 illustrate an example embodiment in which the deleafing protrusions 108 are implemented in a belt structure, configured vertically with opposing belts of controllable relative movement as explained above. Protrusions 108, or variations thereof, may be implemented in other configurations. For example, an array of protrusions 108 may be implemented across the bottom and/or around the interior surface of a drum that rotates, shakes or oscillates to clean and/or deleaf plant material within the drum. In another embodiment, an array of protrusions 108 may be implemented along the interior surface of a trommel or other cylindrical structure that rotates to deleaf and/or clean the plant material. In yet another embodiment, a plurality of protrusions 108 may be implemented on one or more circular disc surfaces that rotate, translate or oscillate to deleaf and/or clean the plant material. In another embodiment, a plurality of protrusions 108 may protrude from the exterior surface of one or more rollers or cylinders. The rollers may be aligned parallel to one another, or in a slight angle relative to one another to separate the plant material by size. Alternatively, a plurality of protrusions 108 may be implemented in a stationary panel or pad of various geometries over which the plant material may pass or be moved.

According to a preferred embodiment, internal and external surfaces of the above described processing apparatus that may come in contact with plant material comprise food safe materials including but not limited to stainless steel, food grade silicone, food grade polyethertherketone (PEEK), and food grade ultra-high molecular weight (UHMW) polyethylene.

Figure 8A:
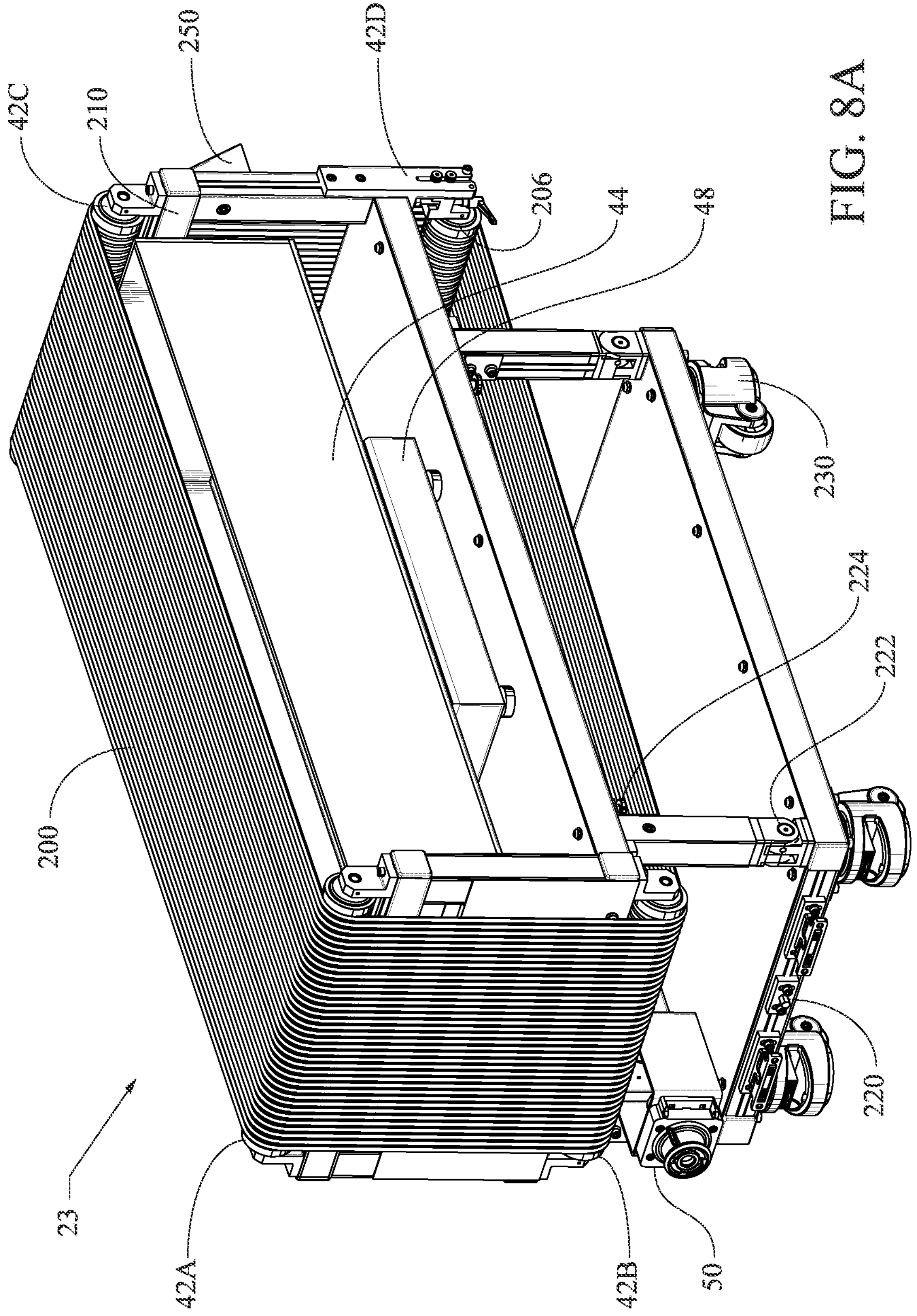
FIG. 8A illustrates a perspective view of a separator cart assembly in accordance with a preferred embodiment of the present invention.

FIG. 8A illustrates a perspective view of a preferred embodiment of separator cart assembly 23. Separator cart assembly 23 includes a plurality of separator belts 200 at a desired spacing for allowing leaves to pass through the rollers into collection bin 44. In a preferred embodiment, separator belts 200 are a 6 mm diameter polyurethane round belt available from DURABELT. In the illustrated embodiment, separator belts 200 have a fixed spacing, for example, 4 mm.

Separator belts 200 rotate about upper rollers 42A and 42B, and lower rollers 42C and 42D. One or more of the rollers is a powered roller having a variably controlled rate of rotation. Preferably one or more of the rollers has an electrically conductive exterior surface connected to an electrical ground through electrical connector 50 to discharge static electricity that may accumulate on the surface of separator belts 200.

A tensioning assembly 214 permits vertical adjustment of roller 42C, enabling the tension of separator belts 200 to be increased or decreased. According to one embodiment, removal of separator belts 200 is achieved by reducing tension on roller 42C through tensioning assembly 214, and by releasing upright fasteners 224 and 225 of riser legs 227 and 229, which permits riser legs 227 and 229 to pivot about respective hinges 222 and 231, enabling removal and replacement of separator belts 200.

Collector bin 44 is removable and rests atop scale 48. Scale 48 is configured to report to HMI 21 the mass of material collected within collector bin 44. An example scale 48 is the ARLYN SCALES having an ultra-precision Surface Acoustic Wave (SAW) transducer. In addition to determining the mass of trim material falling into bin 44, the trim mass measurement may be used to indicate that the bin 44 is full, or nearly full, either sounding an alarm and/or turning off the deleafing system until the bin is emptied and replaced. Separator cart assembly 23 includes four castor wheels 230, for example leveling plate castor wheels, MCMASTER CARR Part No. 9008T53.

In an alternative embodiment, a side output conveyor (not shown) may be implemented beneath separator belts 200 to convey separated trim material outward orthogonally from the separator belts 200, out the side of and through an opening (not shown) in the separator assembly 22 shown in FIG. 1.

Electrical connection socket interface 50 enables electrical connectivity between separator cart assembly 23 and assembly 10 for providing power and an electrical ground to components of the separator cart assembly 23 (e.g., rollers, scale, etc.) and for communicating data and signals from components of the separator cart assemble (e.g., weight, proximity switch position, etc.). An example socket interface 50 is EZ CONNECTOR Part No. 6005. Rest button 220 ensures proper alignment between separator cart assembly 23 and separator assembly 22.

Figure 8B:
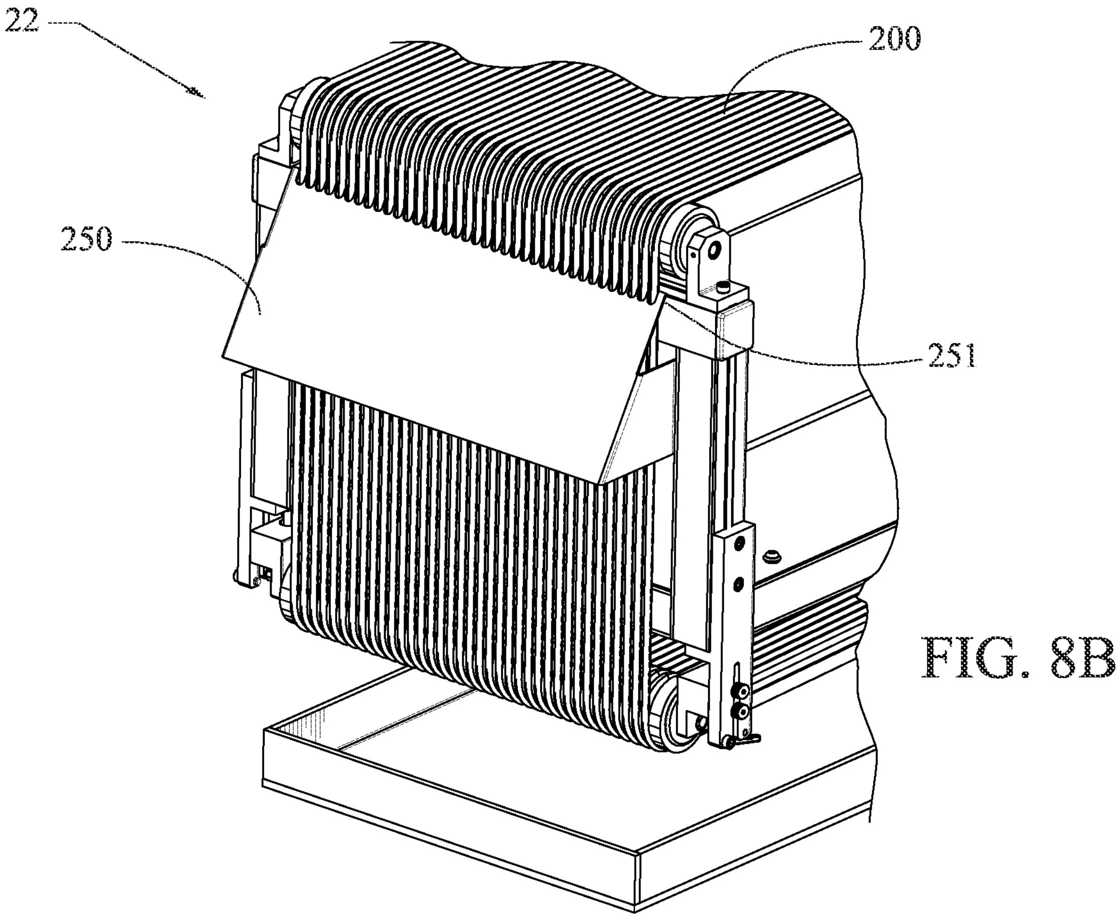
FIG. 8B illustrates the opposite perspective view of the separator cart assembly depicted in FIG. 8A in accordance with a preferred embodiment of the present invention.
Figure 10:
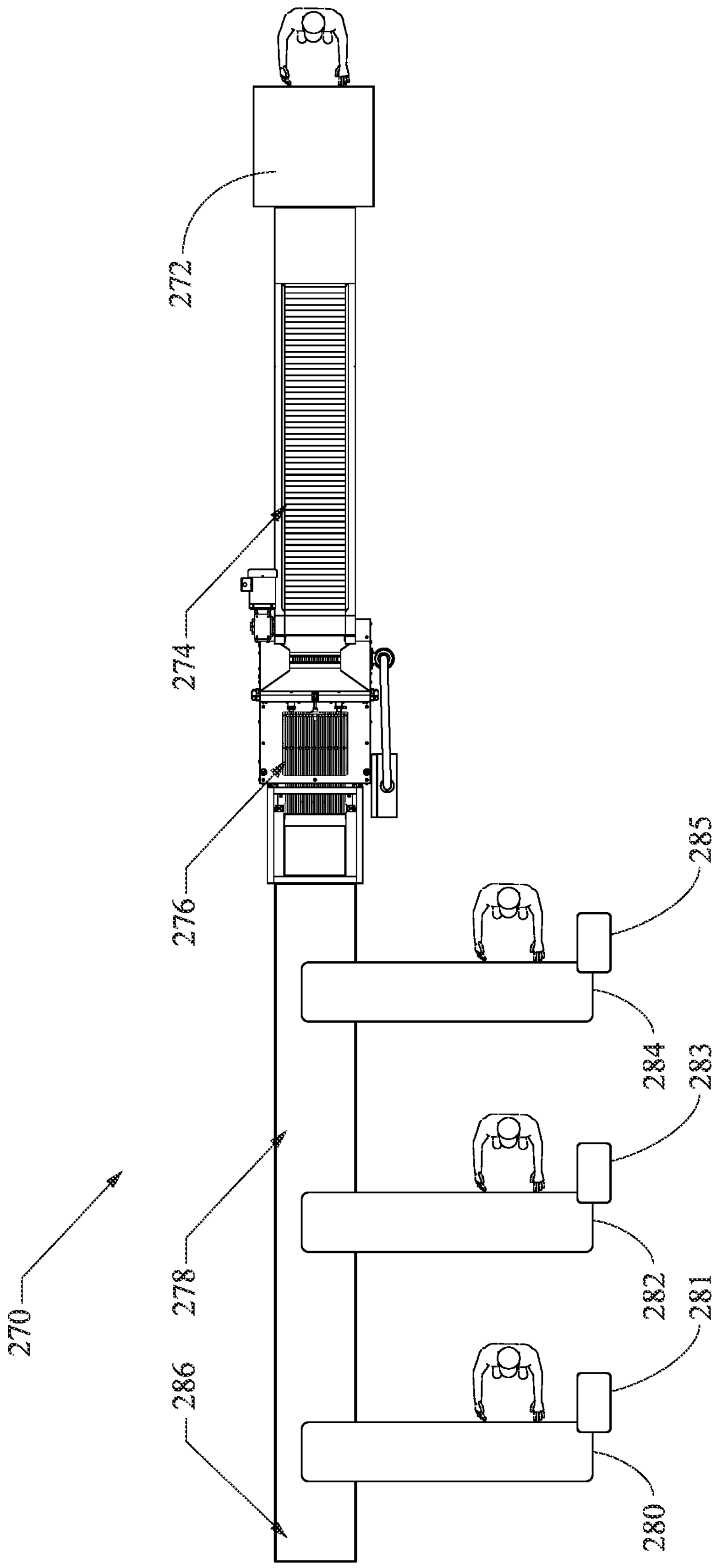
FIG. 10 illustrates an example processing line including a sorter assembly in accordance with a preferred embodiment of the present invention.

FIG. 8B illustrates the opposite perspective end of separator cart assembly 23 depicted in FIG. 8A. Separator cart assembly 23 may include a diverter plate 250 for diverting desired plant material travel along separator belts 200 into output bin 24 (shown in FIG. 1) or for further processing (e.g., as shown in FIG. 10). Diverter plate 250 preferably includes a plurality of protrusions 251 that extend into the spacing between separator belts 200. Protrusions 251 help prevent plant and trim material from travelling past diverter plate 250. Preferably, diverter plate 250 is made of stainless steel and connected to an electrical ground, to help discharge static electricity that accumulates in the separator belts 200 and the plant material during processing.

Figure 9:
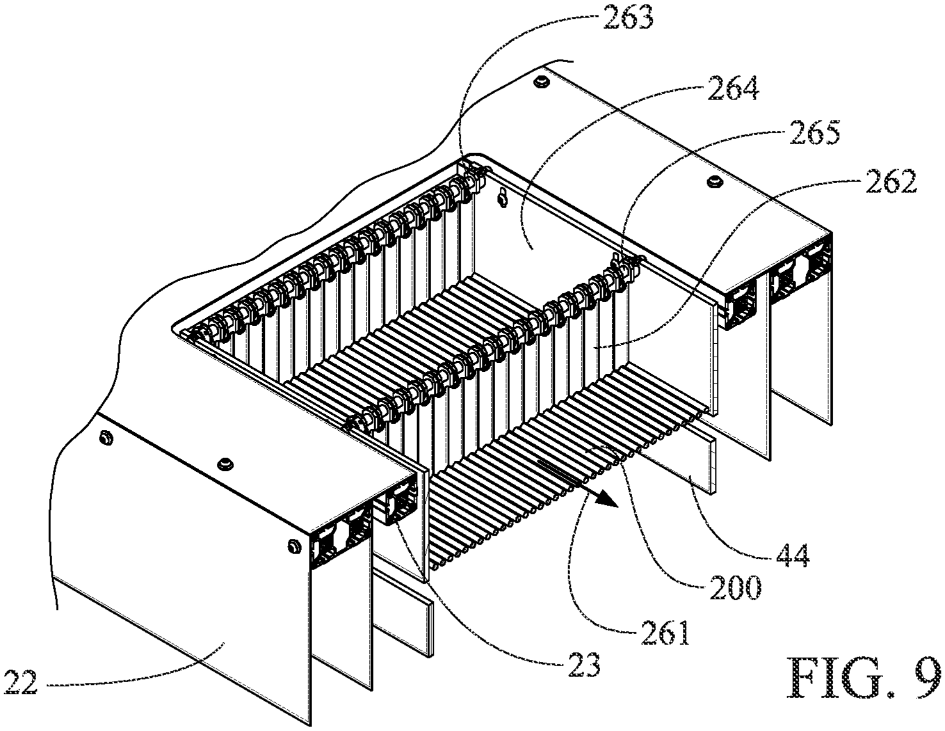
FIG. 9 illustrates cut-away section of separator assembly 22, including separator cart assembly 23.

FIG. 9 illustrates cut-away section of separator assembly 22, including separator cart assembly 23. According to one embodiment, a plurality of agitator protrusions 262 extend downward from pivot axis rods 263 and 265. Agitators 262 are configured to freely rotate about pivot axis rods 263 and 265 to help lightly agitate the plant material and help ensure trim material passes downward through the separator belts 200 to collector bin 44 below. Agitators 262 are preferably configured with sufficient weight to achieve rotation and agitation of plant material proceeding in direction 261, while at the same time permitting the plant material to pass under and past protrusions 262 in direction 261 without accumulating and interfering with the progression of material from the separator assembly 18 to the output bin 24 (not shown). Preferably, the height of pivot axis rods 263 and 265 relative to separator belts 200 is adjustable.

In one embodiment, protrusions 262 and pivot axis rods 263 and 265 are made of metal to enable discharge of accumulated static electricity through an electrical ground. Protrusions 262 may also include fingers (not shown) that extend in the gaps between the separator belts 200 to help trim material pass below the separator belts.

Alternatively or additionally, one or more baffles (not shown) may be implemented to direct plant material traveling along separator belts 200 in a sideways direction over a plurality of separator belts 200 before passing in direction 261 as the plant material progresses from the separator assembly 18 to the output bin 24 (not shown). This to help ensure trim material is separated from the desirable plant material, and that the trim material passes downward through the separator belts 200 to collector bin 44 below. In yet another embodiment, some or all of separator belts 200 may be agitated to cause vibration among the belts to help ensure trim material passes downward through the separator belts 20 to collector bin 44 below.

Additionally or alternatively, air pressure may be used to assist in the deleafing and/or separation operations. With respect to deleafing, air pressure and one or more nozzles may be implemented to translate the plant material during processing, and/or separate leaves from the plant material. Air pressure may also be implemented to (1) separate trim material from plant material, and/or (2) separate deleafed plant material by size.

FIG. 10 illustrates an example processing line 270 including input hopper 272, conveyor assembly 275, deleafing and trim separation assembly 276, and sorter assembly 278 for further processing. Further processing may include but is not limited to separating by the size of the plant material, washing, quality control, and subsequent trimming or destemming operations. In a preferred embodiment, separation assembly 276 includes one or more separator segments 277*a*, 277*b* and 277*c*, each segment having a plurality of driven separator belts (not shown) with predefined spacing that increases from segment 277A to 277B to 277C. For example, the belt spacing for a "small" segment 277A is 4 mm, the spacing for the "medium" segment 277B is 2 cm, and the spacing for the "large" segment 277C is 3.5 cm. After desirable plant material is processed by deleafing and trim separation assembly 276, the material is translated from segment 277A to 277B to 277C. Because the belt spacing increases from segment to segment, desirable plant material having a dimension below the belt spacing of small segment 277A will fall below the belts, into the small material collection area 284. Desirable plant material having a dimension below the belt spacing of medium segment 277B will fall below the belts, into the small material collection area 282. Desirable plant material having a dimension below the belt spacing of large segment 277C will fall below the belts, into the small material collection area 280. Extra large plant material that does not fall between the belts is collected at the end of the conveyor segments in area 286.

In an alternate embodiment, a single separation segment is provided having a gradual increasing of separator belt separation in the direction of material translation 261. Smaller material is separated as materials exit deleafing and trim separation assembly 276, followed by medium material, followed by larger material. Those of skill in the art will recognize that a variety of separation configurations and directions may be implemented.

Figure 11:
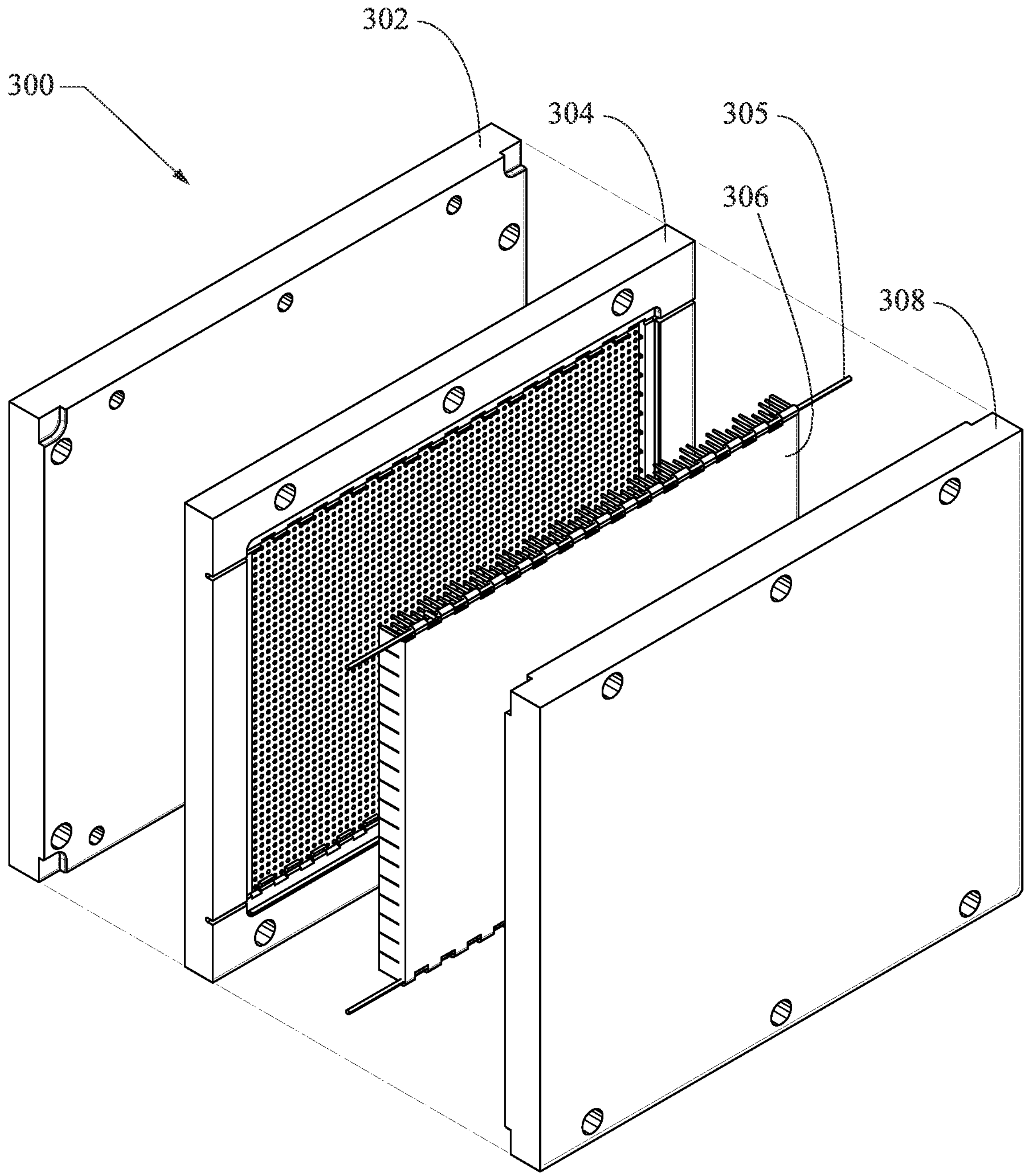
FIG. 11 illustrates a mold assembly for vacuum molding deleafing belt segments in accordance with a preferred embodiment of the present invention.

FIG. 11 illustrates a mold assembly 300 for vacuum molding deleafing belt segments 306 in accordance with a preferred embodiment. Vacuum mold assembly 300 includes platens such as top plate 302, bottom plate 308 and mold top plate 304 having a negative profile of deleafing belt segment 306. In one embodiment, molding deleafing belt segments 306 includes a combination vacuum transfer mold and compression mold process. A first uncured silicon sheet (not shown) may be inserted between the top plate 302 and the mold top plate 340. A second uncured silicon sheet (not shown) may be inserted between the mold top plate 340 and the bottom plate 308. The platens may be heated to 350-400 degrees Fahrenheit, and then compressed together with the inserted unsecured silicon sheets for approximately 4-5 minutes. A vacuum may then be applied to, e.g., the mold top plate 340 to ensure even and complete distribution of silicone for uniform molding of the belt segment 306 within the mold cavity.

Figure 12:
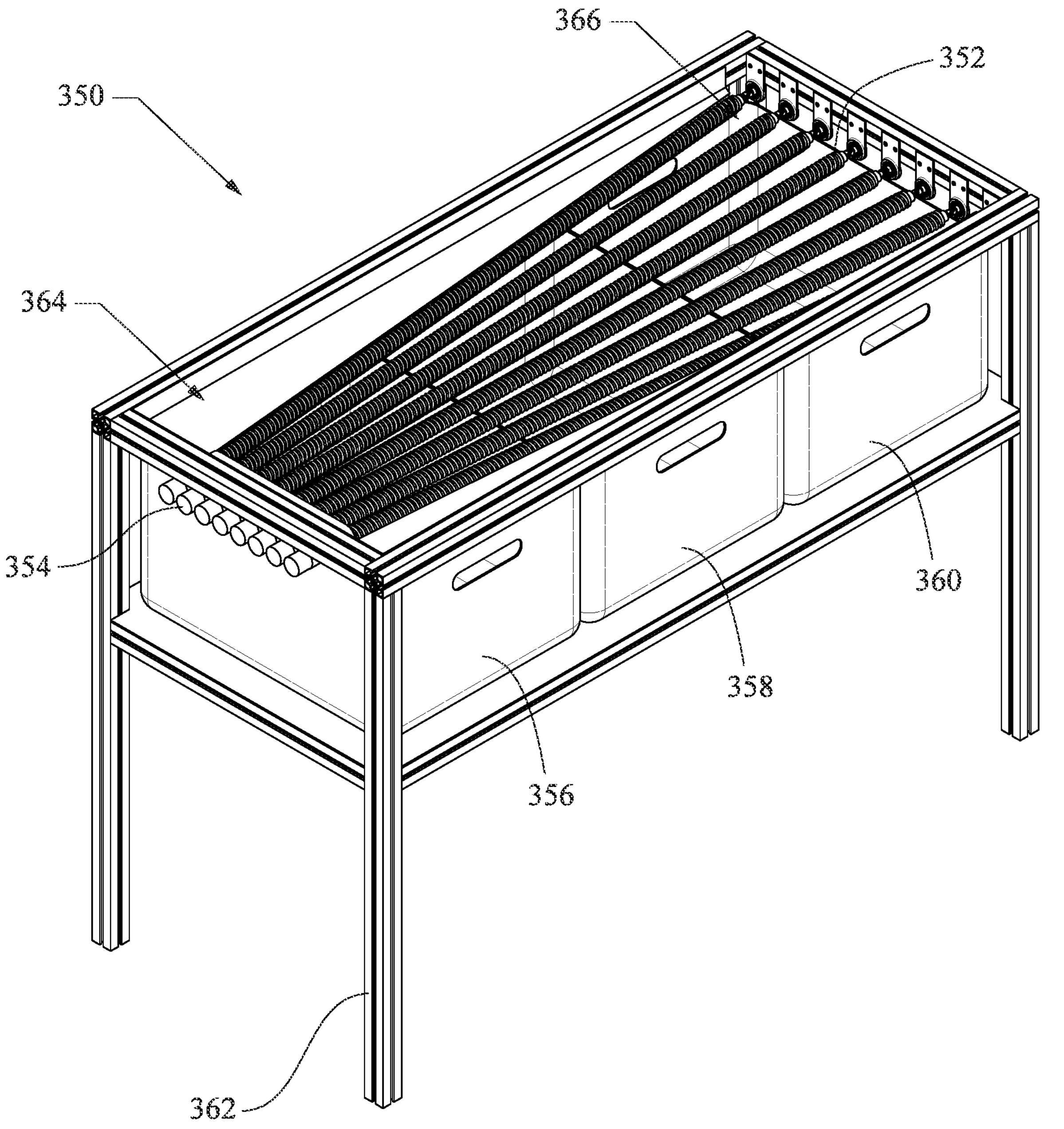
FIGS. 12 and 13 illustrate a separator assembly in accordance with a preferred embodiment of the present invention.

FIG. 12 illustrates a supplemental or alternative separator assembly 350 including a frame 362 supporting a plurality of spaced spindles 352 rotated about their central axes by one or more individually-controlled motors 354. Motors 354 may be separately affixed to the frame 362 or internal to the spindles 352. In an alternative configuration, a single motor drives a plurality of spindles through a gearbox or chain/belt drive.

Figure 13:
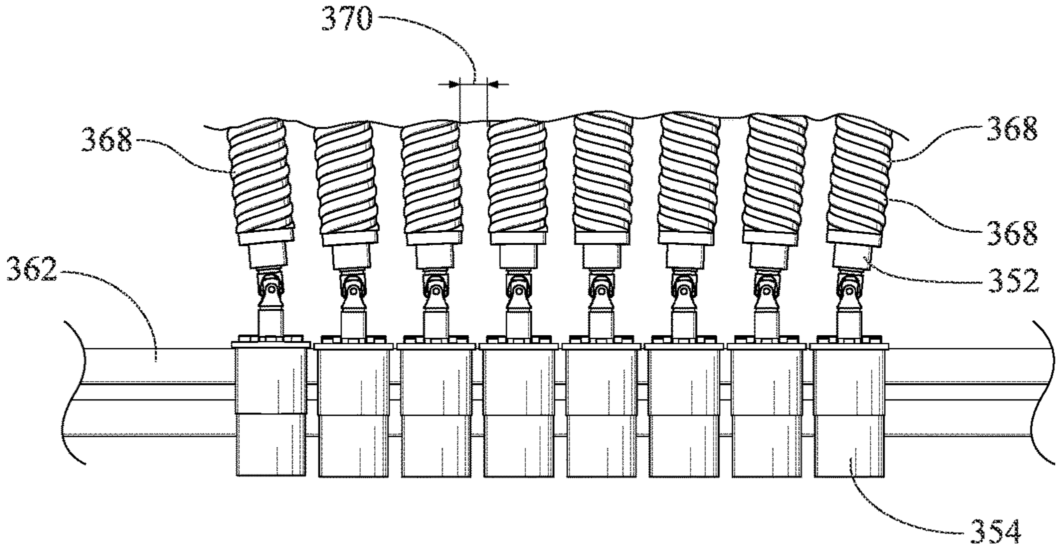

Spindles 352 may be implemented parallel to one another at a defined distance 370 as illustrated in FIG. 13, or the spindles may be implemented in a diverging configuration as illustrated in FIG. 12, in which the distance 370 between the spindles 352 increases from an input end 364 to an output end 366. In the diverging configuration illustrated in FIG. 12, one or more output bins 356, 358, 360 may be implemented for receiving small, medium and large material based on relative spacing 370 between spindles 352. In an alternative configuration, one or more conveyors (not shown) are implemented transverse to the direction of the spindles 352 to extract plant and/or trim material as it falls through the spacing 370 between the spindles 352.

As illustrated in FIG. 13, the spindles 352 may be implemented with a plurality of protrusions 368. In one embodiment, the protrusions may be implemented in a helical configuration to translate plant material in a direction from input region 364 to output region 366 as the spindles 352 rotate. In an alternative embodiment, protrusions may comprise a plurality of fingers similar in shape to that illustrated in FIG. 6D. Other protrusion geometries may be implemented on spindles 352 to cause plant material to propagate from region 364 to region 366. A variety of materials may be implemented for spindles 352 and/or protrusions 368, including but not limited to silicon having a Shore A durometer in the range of approximately 45-70.

Figure 14:
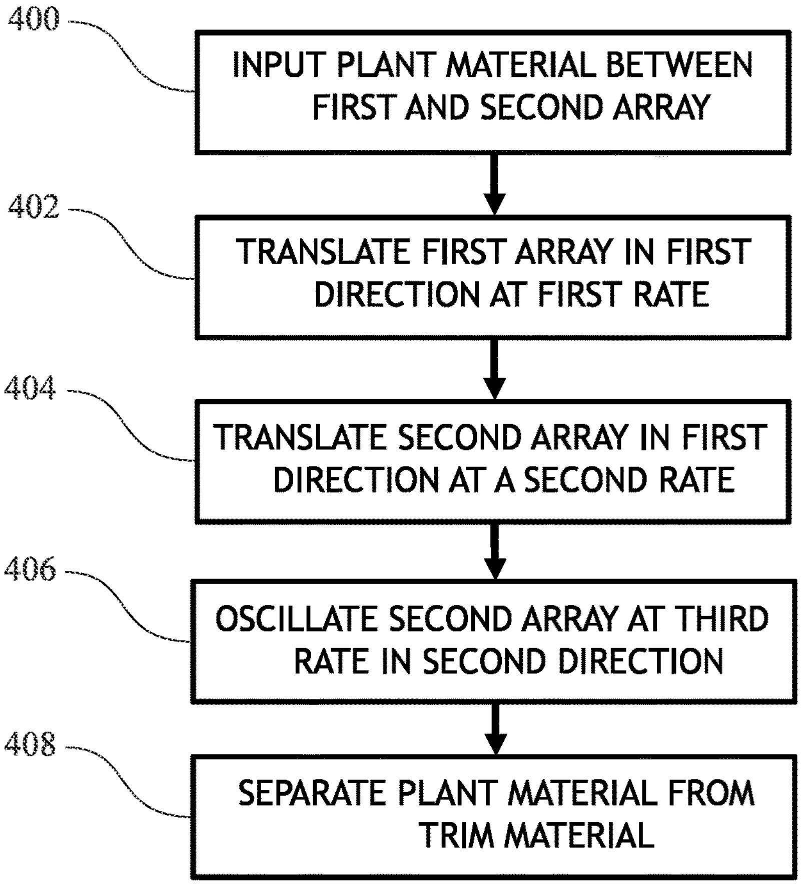
FIG. 14 illustrates an example method for implementing aspects of an embodiment of the present invention.

FIG. 14 illustrates an example method of implementing an embodiment of the present invention. In step 400, plant material to be deleafed is input between the first and second array of complaint protrusions. In step 402, the first array of compliant protrusions is translated in a first direction, e.g., downward, at a first controlled and predefined rate. In step 404, the second array of compliant protrusions is translated in the same first direction, e.g., downward, at a second controlled and predefined rate. The second rate may be faster or slower than the first rate to ensure vertical rolling of the plant material as the material translates from the input to the output. In step 406, the second (and/or first) array is oscillated in a direction that is different from the first direction, e.g. side-to-side, at a third controlled and predefined rate. This motion ensures lateral back-and-forth rolling of the plant material as the material translates from the input to the output. In step 408, trim material that the compliant protrusions have removed from the plant material is separated from the plant material. Implementation of this method is not limited to the order described, and not all steps are required to implement embodiments of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for deleafing plant material, the apparatus comprising:

a first array of compliant protrusions extending from a first substrate;

a second array of compliant protrusions extending from a second substrate, the second substrate being spaced from the first substrate in a first direction with the second array of compliant protrusions positioned opposite at least a portion of the first array of compliant protrusions;

a first drive motor configured to translate the first substrate and the first array of compliant protrusions in a second direction at a first rate, wherein the second direction is orthogonal to the first direction;

a second drive motor configured to translate the second substrate and the second array of compliant protrusions in the second direction at a second rate that is different than the first rate;

a third drive motor configured to oscillate the second substrate in a third direction that is orthogonal to the first and second directions to move the second substrate side-to-side relative to the first substrate; and a separator having a plurality of separating members positioned one or more distances from each other to define at least one separator distance between the plurality of separating members to separate larger plant material from smaller plant material.

2. The apparatus of claim 1 wherein the first or second substrate comprise a belt having the first or second array of compliant protrusions.

3. The apparatus of claim 2 wherein the first or second drive motors are powered rollers to rotate the belt.

4. The apparatus of claim 2 additionally comprising one or more belt tensioners.

5. The apparatus of claim 1 wherein the plurality of separating members comprise a plurality of separator belts, and wherein a fourth drive motor rotates at least some of the plurality of separator belts to propagate plant material toward an output.

6. The apparatus of claim 5, wherein the plurality of separator belts additionally comprising a plurality of agitator protrusions configured to agitate the plant material as the separator belts propagate the plant material toward the output.

7. The apparatus of claim 1 wherein the separating members comprise two or more spindles, and wherein a fourth drive motor rotates the two or more spindles to propagate plant material toward an output.

8. The apparatus of claim 7 wherein one or more spindles include a helical protrusion.

9. The apparatus of claim 1 wherein at least a portion of the first or second array of compliant protrusions have a shore A durometer in the range of 45-70.

10. The apparatus of claim 1 additionally comprising a frame configured to separate the first substrate and the second substrate by an adjustable distance in the first direction to set an interference or gap between the first and second array of protrusions.

11. The apparatus of claim 1 additionally comprising an input conveyor to translate plant material toward the first and second array of compliant protrusions.

12. The apparatus of claim 1 additionally comprising one or more grounding electrodes contacting at least a portion of the compliant protrusions to discharge static electricity from the compliant protrusions.

13. A method of deleafing plant material, the method comprising:

translating a first array of compliant protrusions extending from a first substrate in a first direction at a first rate;

translating a second array of compliant protrusions extending from a second substrate in the first direction at a second rate that is different than the first rate, wherein the second substrate is spaced from the first substrate in a second direction;

oscillating the second substrate in a third direction that is orthogonal to the first and second directions to move the second substrate side-to-side relative to the first substrate;

inputting plant material between the first and second substrates to remove trim material from the plant material as the protrusions translate and oscillate; and separating the plant material from the trim material.

14. The method of claim 13 wherein the first rate, the second rate and the third rate are independently adjustable to define a rolling pattern for the plant material as the compliant protrusions propagate the plant material from an input to an output.

* * * * *